US012574867B2

(12) United States Patent
Abedini et al.

(10) Patent No.: US 12,574,867 B2
(45) Date of Patent: Mar. 10, 2026

(54) POWER CONTROL OF NETWORK-CONTROLLED REPEATERS

(71) Applicant: QUALCOMM Incorporated, San Diego, CA (US)

(72) Inventors: Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 18/448,146

(22) Filed: Aug. 10, 2023

(65) Prior Publication Data

US 2024/0064663 A1 Feb. 22, 2024

Related U.S. Application Data

(60) Provisional application No. 63/371,168, filed on Aug. 11, 2022.

(51) Int. Cl.
| | |
|---|---|
| *H04W 52/52* | (2009.01) |
| *H04W 52/36* | (2009.01) |
| *H04W 52/46* | (2009.01) |

(52) U.S. Cl.
CPC ......... *H04W 52/52* (2013.01); *H04W 52/367* (2013.01); *H04W 52/46* (2013.01)

(58) Field of Classification Search
CPC ... H04W 52/52; H04W 52/367; H04W 52/46; H04W 52/146
See application file for complete search history.

(56) References Cited

U.S. PATENT DOCUMENTS

| | | | | |
|---|---|---|---|---|
| 9,743,362 | B1 * | 8/2017 | Tian ..................... | H04W 52/241 |
| 2011/0273999 | A1 * | 11/2011 | Nagaraja ............... | H04L 1/1692 |
| | | | | 370/252 |
| 2022/0338126 | A1 * | 10/2022 | Soltani .................. | H04W 52/52 |
| 2024/0235659 | A1 * | 7/2024 | Watanabe .......... | H04B 7/15535 |

* cited by examiner

*Primary Examiner* — Fayyaz Alam

(74) *Attorney, Agent, or Firm* — Procopio, Cory, Hargreaves & Savitch LLP

(57) ABSTRACT

A method for wireless communication at a network node and related apparatus are provided. In the method, the network node transmits, to a wireless device, a downlink (DL) signal for amplification and transmission of an amplified DL signal to a user equipment; determine an operating region of the wireless device for amplifying the DL signal. The operating region is one of a power-limited region in which a DL output power of the wireless device reaches a maximum DL output power, and a linear region, in which the DL output power of the wireless device is less than the maximum DL output power. The network node further adjusts the DL output power of the wireless device to cause the wireless device to operate at the linear region when amplifying the DL signal. The method improves the energy efficiency of the wireless device when transmitting the signals.

30 Claims, 20 Drawing Sheets

702

704 NCR

706 UE

708 DL signal(s)

710 amplified DL signal(s)

711 Report 712 determine an operating region of the NCR when amplifying the DL/UL signal 713 UL Signal(s)

715 Forward UL Signal(s)

714 adjust, based on the operating region of the NCR, the DL/UL output power of the NCR to cause the NCR to operate at the linear region when amplifying the DL signal 716 Indication 717 DL signal 718 amplified DL signal 720 UL Signal 722 Forwarded UL signal

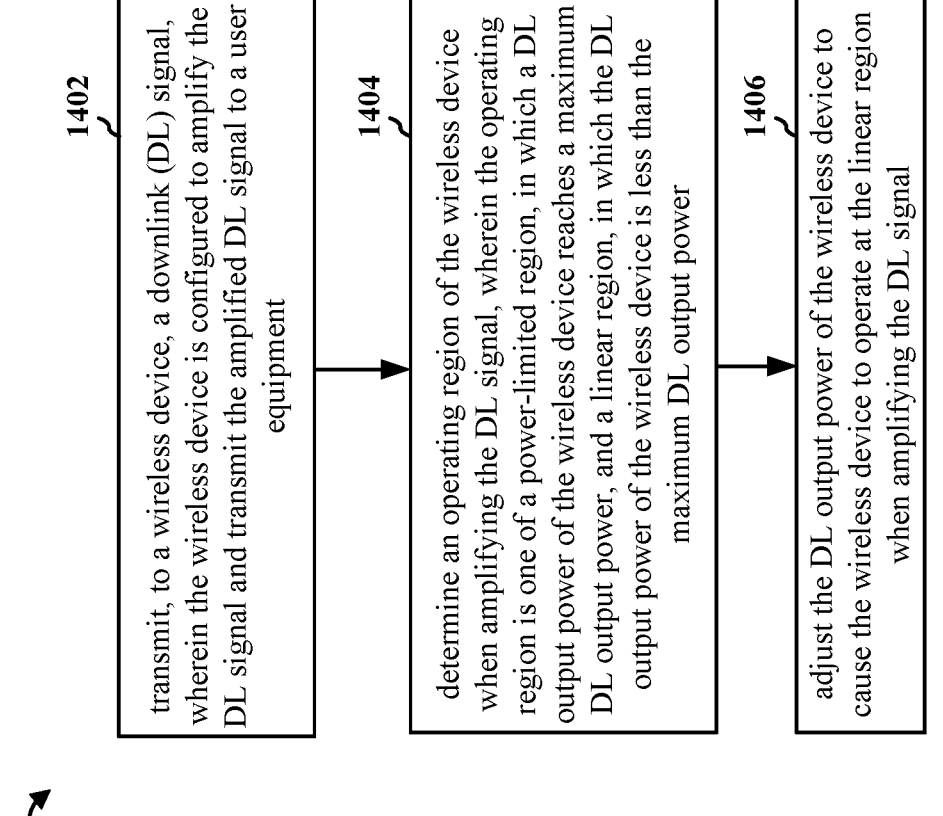

1402 transmit, to a wireless device, a downlink (DL) signal, wherein the wireless device is configured to amplify the DL signal and transmit the amplified DL signal to a user equipment

1404 determine an operating region of the wireless device when amplifying the DL signal, wherein the operating region is one of a power-limited region, in which a DL output power of the wireless device reaches a maximum DL output power, and a linear region, in which the DL output power of the wireless device is less than the maximum DL output power

1406 adjust the DL output power of the wireless device to cause the wireless device to operate at the linear region when amplifying the DL signal

1502 — transmit, to a wireless device, a downlink (DL) signal, wherein the wireless device is configured to amplify the DL signal and transmit the amplified DL signal to a user equipment 1504 — receive a maximum DL output gain of the wireless device, the maximum DL output power of the wireless device, and a received power of the DL signal at the wireless device 1506 — determine, based on the maximum DL output gain, the maximum DL output power, and the received power, the operating region of the wireless device 1508 — receive a status indicator, the status indicator indicating the operating region of the wireless device is one of the linear region and power-limited region 1510 — receive a power offset between a received power of the DL signal at the wireless device and an optimal power 1512 — determining, based on the power offset, the operating region of the wireless device 1520 — determine the operating region of the wireless device when amplifying an uplink (UL) signal 1522 — adjust the UL output power of the wireless device to cause the wireless device to operate at the linear region when amplifying the UL signal 1514 — adjust the DL output power of the wireless device by adjusting a transmit power of the DL signal on the network node 1516 — adjust at least one of: a maximum DL output gain of the wireless device or the maximum DL output power of the wireless device 1518 — provide, to the wireless device, an adjustment to the DL output power of the wireless device with respect to a reference occasion

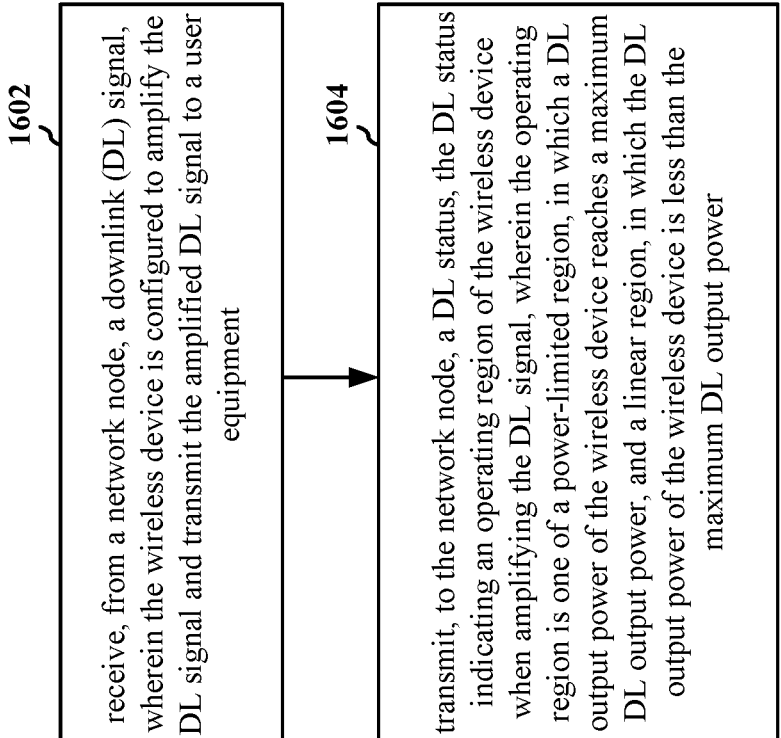

1602 receive, from a network node, a downlink (DL) signal, wherein the wireless device is configured to amplify the DL signal and transmit the amplified DL signal to a user equipment

1604 transmit, to the network node, a DL status, the DL status indicating an operating region of the wireless device when amplifying the DL signal, wherein the operating region is one of a power-limited region, in which a DL output power of the wireless device reaches a maximum DL output power, and a linear region, in which the DL output power of the wireless device is less than the maximum DL output power

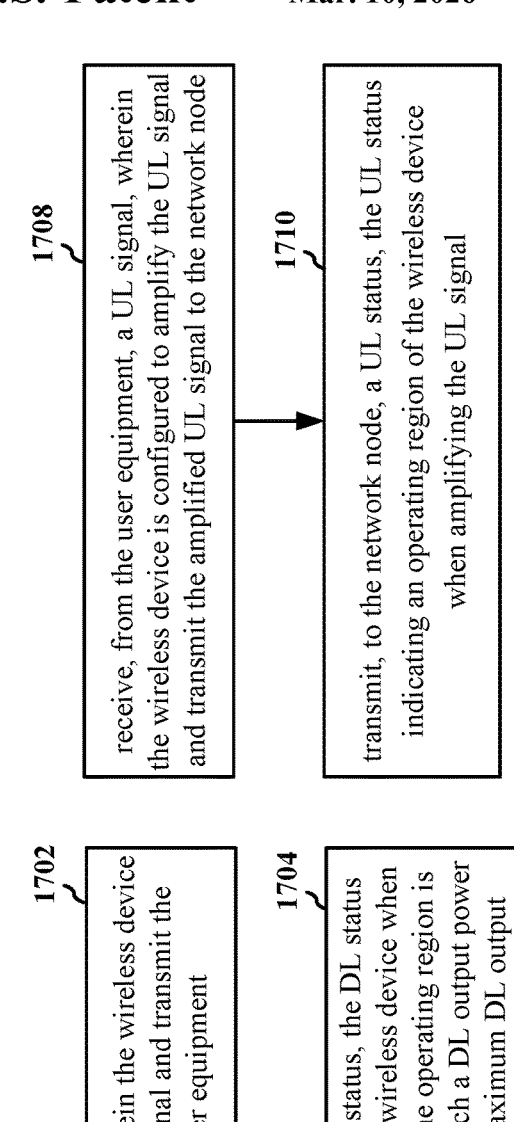

1702 — receive a downlink (DL) signal, wherein the wireless device is configured to amplify the DL signal and transmit the amplified DL signal to a user equipment 1704 — transmit, to the network node, a DL status, the DL status indicating an operating region of the wireless device when amplifying the DL signal, wherein the operating region is one of a power-limited region, in which a DL output power of the wireless device reaches a maximum DL output power, and a linear region, in which the DL output power of the wireless device is less than the maximum DL output power 1706 — receive power control parameters for amplifying the DL signal, wherein the power control parameters comprise at least one of: an adjusted maximum DL output gain of the wireless device; or an adjusted maximum DL output power of the wireless device, wherein the wireless device is configured to amplify the DL signal under at least one of the adjusted maximum DL output gain and the adjusted maximum DL output power 1708 — receive, from the user equipment, a UL signal, wherein the wireless device is configured to amplify the UL signal and transmit the amplified UL signal to the network node 1710 — transmit, to the network node, a UL status, the UL status indicating an operating region of the wireless device when amplifying the UL signal

POWER CONTROL OF NETWORK-CONTROLLED REPEATERS

CROSS REFERENCE TO RELATED APPLICATION(S)

This application claims the benefit of and priority to U.S. Provisional Application Ser. No. 63/371,168, entitled "POWER CONTROL OF NETWORK-CONTROLLED REPEATERS" and filed on Aug. 11, 2022, which is expressly incorporated by reference herein in its entirety.

TECHNICAL FIELD

The present disclosure relates generally to communication systems, and more particularly, to a power control method for network-controlled repeaters (NCRs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a memory; and at least one processor coupled to the memory and, based at least in part on information stored in the memory, the at least one processor may be configured to: transmit, to a wireless device, a downlink (DL) signal, wherein the wireless device is configured to amplify the DL signal and transmit the amplified DL signal to a user equipment; determine an operating region of the wireless device when amplifying the DL signal, wherein the operating region is one of a power-limited region, in which the DL output power of the wireless device reaches a maximum DL output power, and a linear region, in which the DL output power of the wireless device is less than the maximum DL output power; and adjust the DL output power of the wireless device to cause the wireless device to operate at the linear region when amplifying the DL signal.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a call flow diagram illustrating a method of power control of an NCR in accordance with various aspects of the present disclosure.

FIG. 14 is a flowchart illustrating methods of power control of an NCR in accordance with various aspects of the present disclosure.

FIG. 15 is a flowchart illustrating methods of power control of an NCR in accordance with various aspects of the present disclosure.

FIG. 16 is a flowchart illustrating methods of power control of an NCR in accordance with various aspects of the present disclosure.

FIG. 17 is a flowchart illustrating methods of power control of an NCR in accordance with various aspects of the present disclosure.

DETAILED DESCRIPTION

Figure 1:
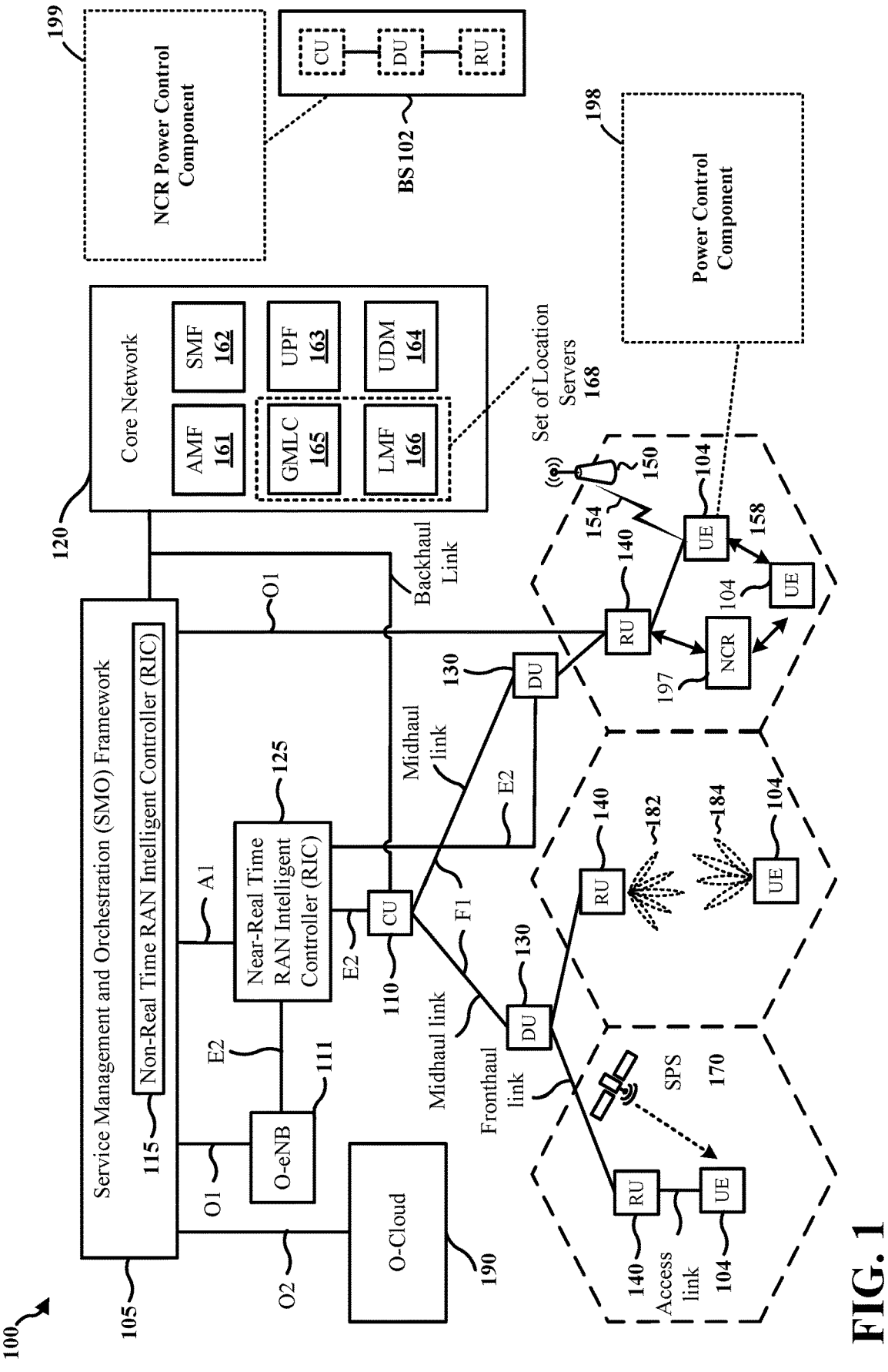
FIG. 1 is a diagram illustrating an example of a wireless communication system and an access network.

Wireless communication may be exchanged between two devices via a network-controlled repeater (NCR). As an example, a base station may exchange wireless communication with a UE via an NCR that forwards and amplifies the wireless signals. In some power regions, an increase in an output transmission power of the base station leads to a corresponding increase in the transmission power of the amplified signal transmitted by the NCR. In some power regions, an increase in the output transmission power of the base station may not lead to a same level of increased transmission power at the NCR. Such a power region may be referred to as a power limited region or a flat region. Aspects presented herein provide for increased power effi- ciency and more consistent energy per resource element (EPRE) for synchronization signals or reference signals provided via an NCR, by avoiding NCR operation in a power limited region or flat region. Example aspects pre- sented herein provide solutions for downlink (DL) and uplink (UL) power control when the base station does not have direct power control over the NCR and when the base station has power control over the NCR.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are pre- sented with reference to various apparatus and methods. These apparatus and methods are described in the following detailed description and illustrated in the accompanying drawings by various blocks, components, circuits, pro- cesses, algorithms, etc. (collectively referred to as "ele- ments"). These elements may be implemented using elec- tronic hardware, computer software, or any combination thereof. Whether such elements are implemented as hardware or software depends upon the particular application and design constraints imposed on the overall system.

By way of example, an element, or any portion of an element, or any combination of elements may be imple- mented as a "processing system" that includes one or more processors. When multiple processors are implemented, the multiple processors may perform the functions individually or in combination. Examples of processors include micro- processors, microcontrollers, graphics processing units (GPUs), central processing units (CPUs), application pro- cessors, digital signal processors (DSPs), reduced instruc- tion set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various func- tionality described throughout this disclosure. One or more processors in the processing system may execute software. Software, whether referred to as software, firmware, middle- ware, microcode, hardware description language, or other- wise, shall be construed broadly to mean instructions, instruction sets, code, code segments, program code, pro- grams, subprograms, software components, applications, software applications, software packages, routines, subrou- tines, objects, executables, threads of execution, procedures, functions, or any combination thereof.

Accordingly, in one or more example aspects, implemen- tations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE- PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrange- ments and scenarios. Aspects, implementations, and/or use cases described herein may be implemented across many differing platform types, devices, systems, shapes, sizes, and packaging arrangements. For example, aspects, implemen- tations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more tech- niques herein. In some practical settings, devices incorpo- rating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

In some aspects, a base station 102 may transmit communication to one or more UEs 104 via an NCR 197.

Referring again to FIG. 1, in certain aspects, the base station 102 may be include an NCR power control component 199. The NCR power control component 199 may be configured to transmit, to a wireless device, a downlink (DL) signal, wherein the wireless device is configured to amplify the DL signal and transmit the amplified DL signal to a user equipment; determine an operating region of the wireless device when amplifying the DL signal, wherein the operating region is one of a power-limited region, in which the DL output power of the wireless device reaches a maximum DL output power, and a linear region, in which the DL output power of the wireless device is less than the maximum DL output power; and adjust the DL output power of the wireless device to cause the wireless device to operate at the linear region when amplifying the DL signal. In some aspects, a UE 104 may include a power control component 198 configured to cause the UE to perform any of the aspects described in connection with the UE in FIG. 7. In some aspects, the NCR 197 may include an NCR power control component 195 configured to cause the NCR to perform any of the aspects described in connection with the NCR in FIG. 7, and/or performed in the flowchart in FIG. 16 and/or FIG. 17. Although the following description may be focused on 5G NR, the concepts described herein may be applicable to other similar areas, such as LTE, LTE-A, CDMA, GSM, and other wireless technologies.

Figures 2A, 2B, 2C, 2D:
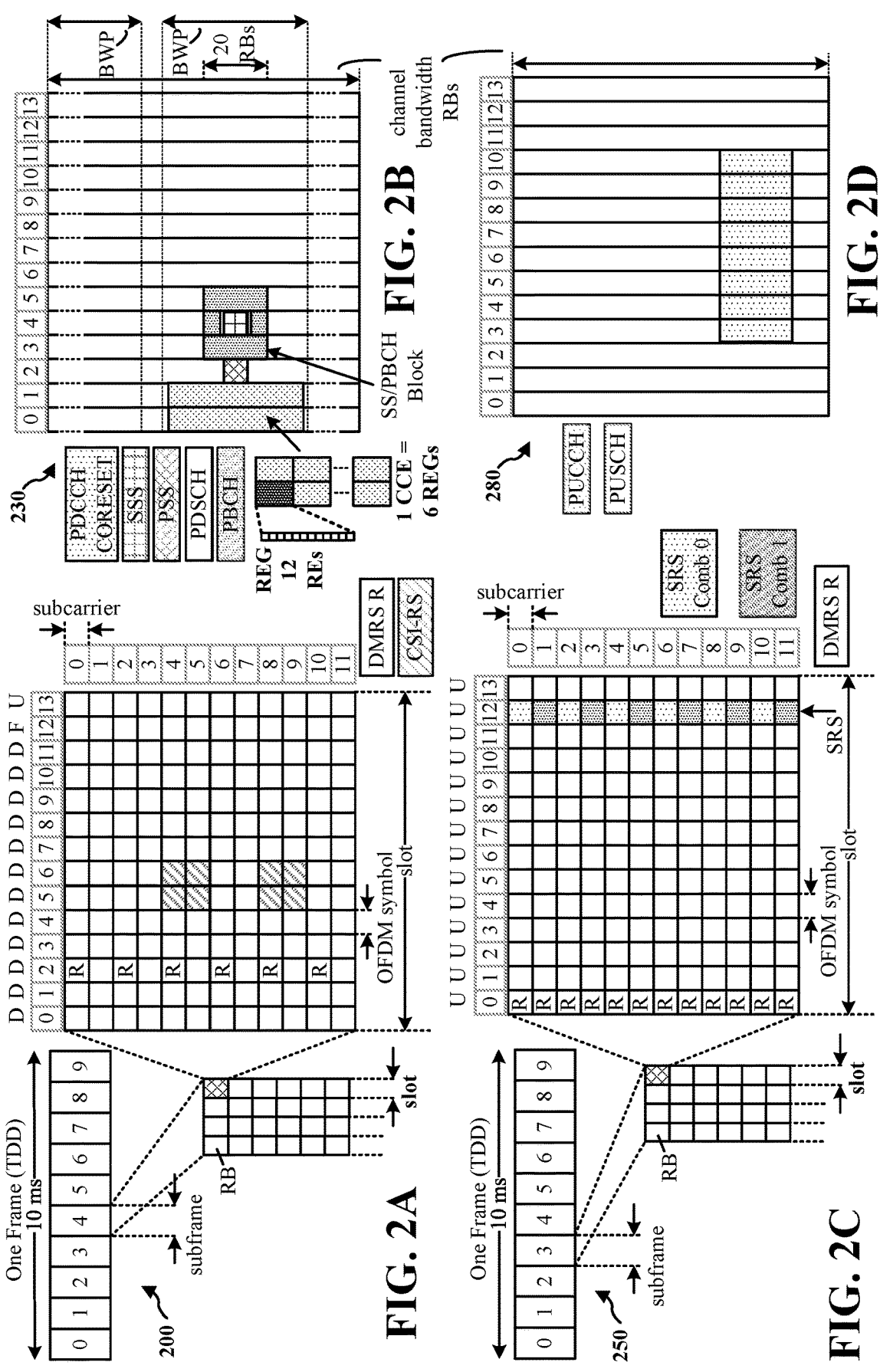
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with

TABLE 1

| Numerology, SCS, and CP | | |
|---|---|---|
| $\mu$ | SCS $\Delta f = 2^{\mu} \cdot 15[\text{kHz}]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
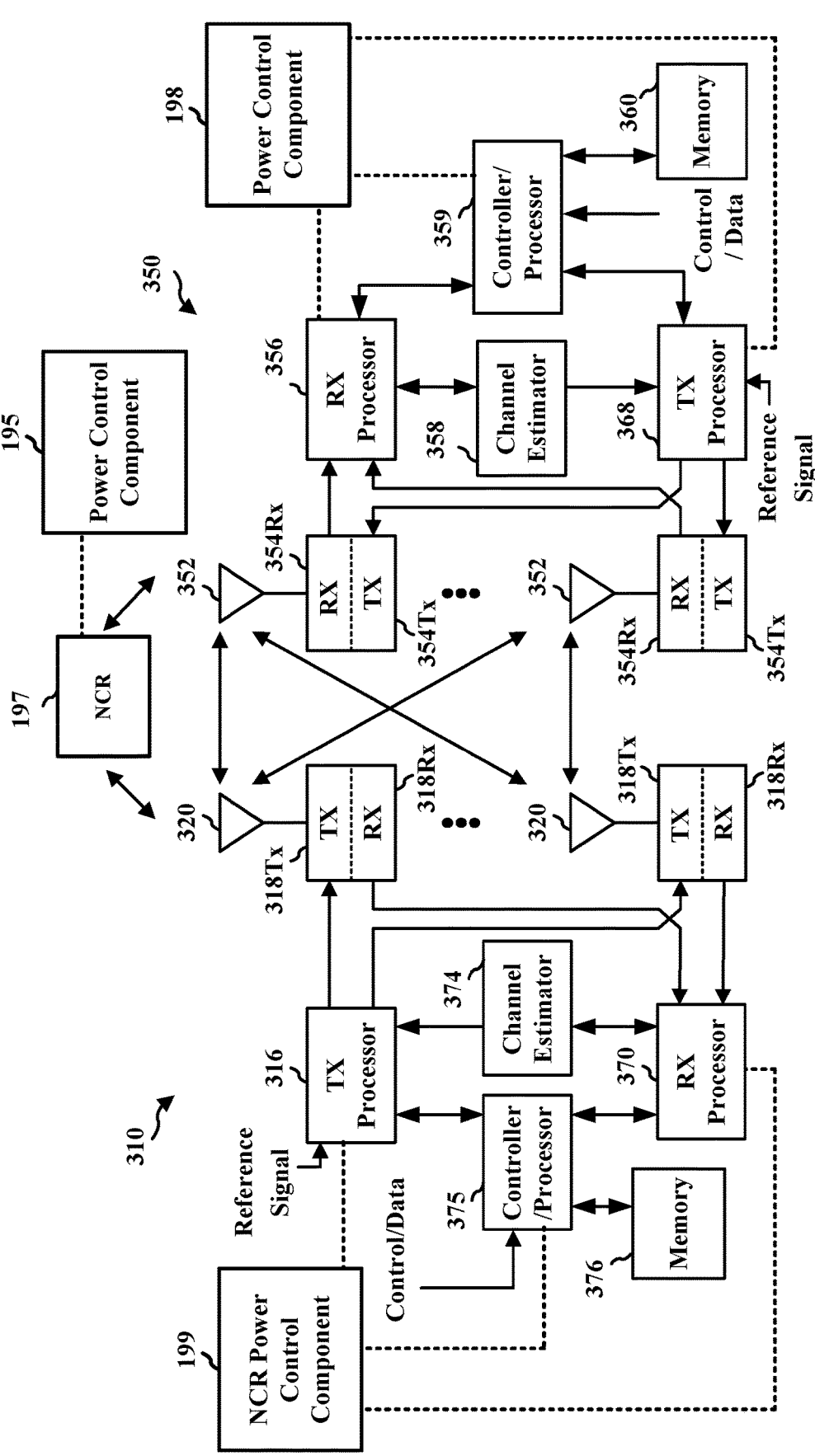
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 316, the RX processor 370, and the controller/processor 375 may be configured to perform aspects in connection with the NCR power control component 199 of FIG. 1.

At least one of the TX processor 368, the RX processor 356, and the controller/processor 359 may be configured to perform aspects in connection with the power control component 198 of FIG. 1. Similarly, the NCR 197 may include a power control component 195 that is configured to perform the aspects described in connection with FIG. 1.

Figure 4:
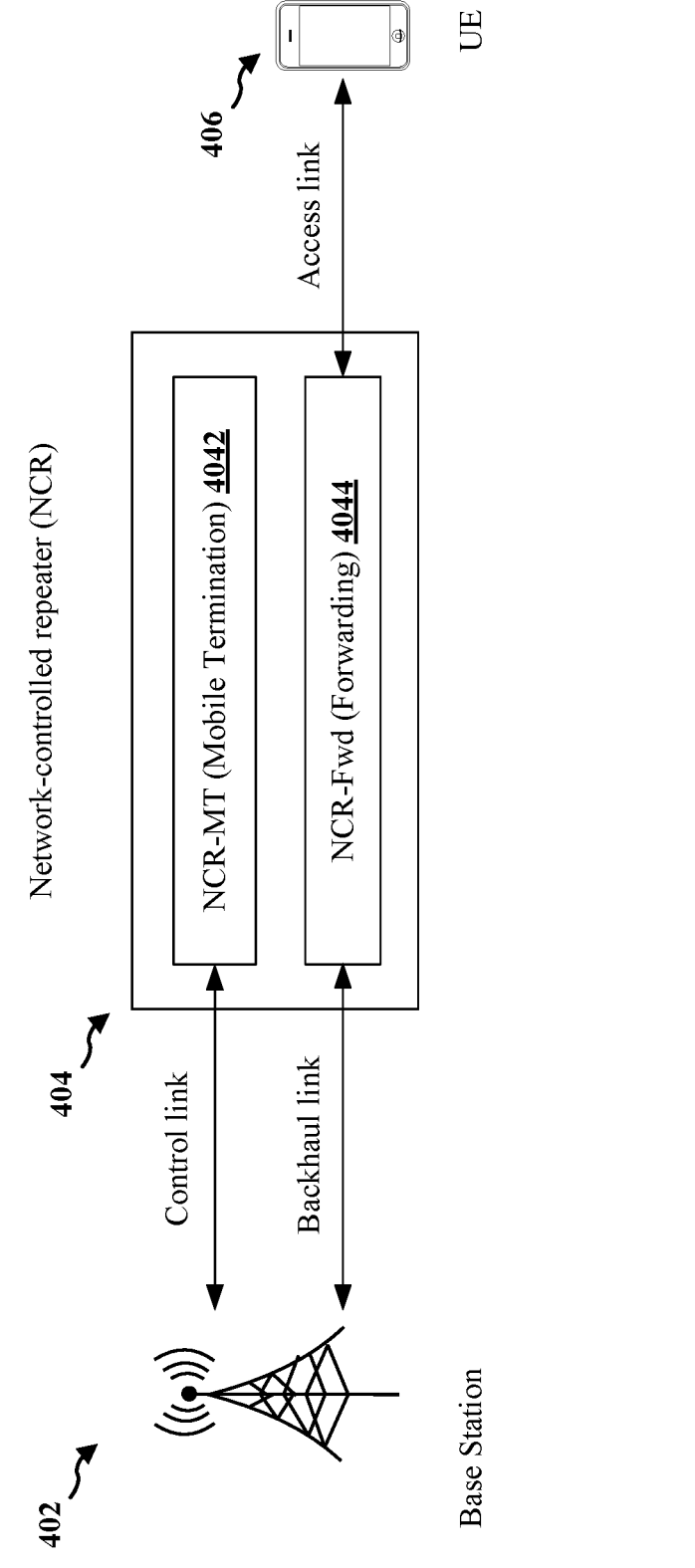
FIG. 4 is a diagram illustrating communication through a network-controlled repeater (NCR) in an access network.

A first wireless device, such as a base station, may transmit wireless communication to one or more wireless devices (such as a UE) via an NCR that forwards and amplifies the signal. FIG. 4 illustrates an example of wireless communication exchanged between a base station and a UE via an NCR. In some power regions, an increase in an output transmission power of the base station leads to a corresponding increase in the transmission power of the amplified signal from the NCR to the UE. In other power regions, an increase in the output transmission power of the base station may not lead to a same level of increased transmission power from the NCR. In some aspects, such a power region may be referred to as a power limited region or a flat region, such as described in connection with FIG. 6. Aspects presented herein provide for increased power efficiency and more consistent energy per resource element (EPRE) for synchronization signals (e.g., SSB) or reference signals (e.g., such as CSI-RS) provided via an NCR, by avoiding NCR operation in a power limited region (e.g., which may be referred to as a flat region). Example aspects presented herein provide solutions for both DL and UL power control when the base station does not have direct power control over the NCR and when the base station does have power control over the NCR.

Figure 5:
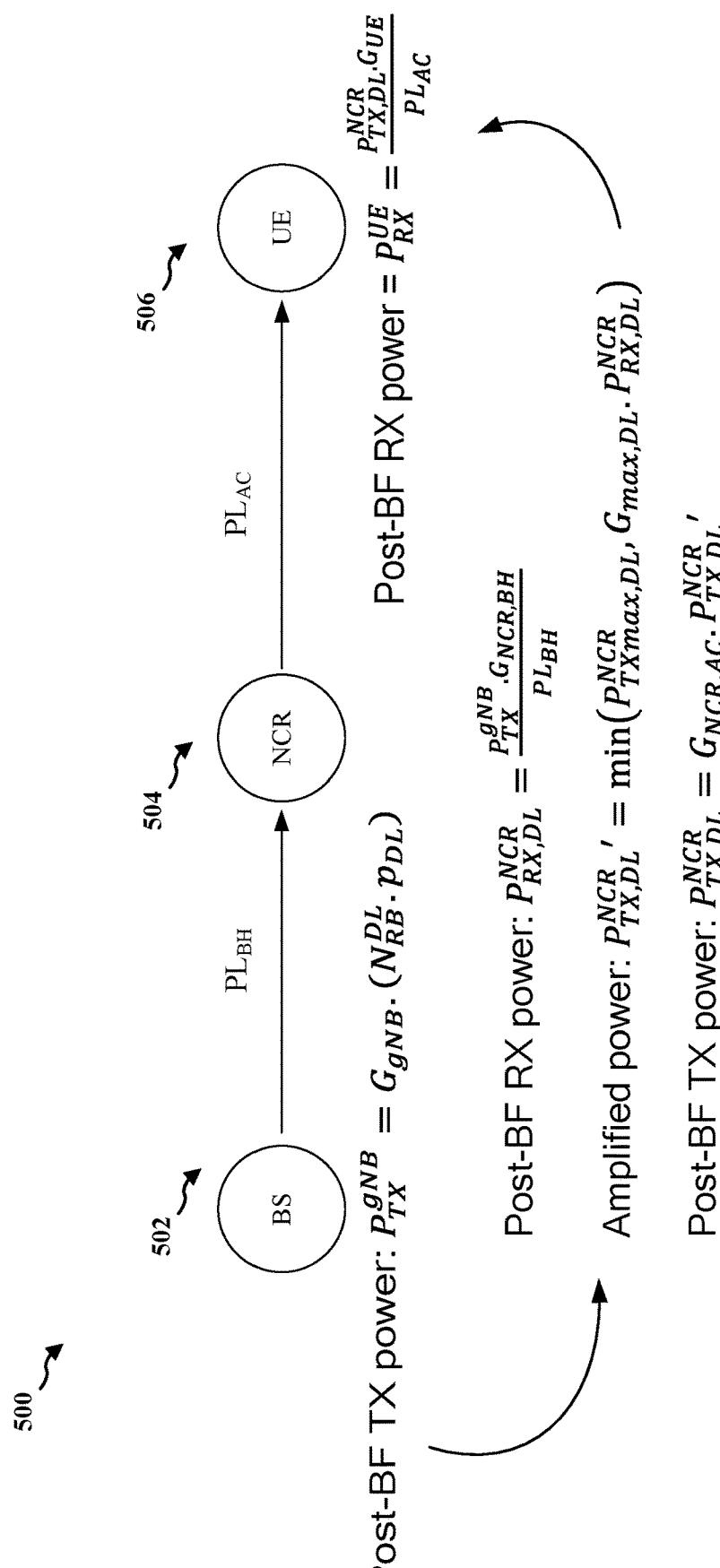
FIG. 5 is a diagram illustrating downlink power at various stages of a DL transmission of an access network.

FIG. 4 is a diagram 400 illustrating an example of wireless communication between a base station 402 and a UE 406 via an NCR 404 in an access network. The NCR may correspond to the NCR 197 illustrated in FIG. 1 and FIG. 3, for example. The NCR 404 may is illustrated as including a mobile-terminated component (NCR-MT) 4042 and a forwarding component (NCR-Fwd) 4044. In some aspects, the NCR-MT 4042 may be connected with the base station 402 via a control link, through which the base station 402 may send to, or receive from the NCR-MT 4042 control signaling (e.g., commands) or information. The NCR-Fwd 4044 may receive and forward (e.g., transmit) a signal in either a DL or UL direction. For example, in the DL direction, the NCR-Fwd 4044 may receive a DL signal (which may also be referred to as a DL transmission) from the base station 402 and forward (and possibly amplify) the DL signal to the UE 406. The NCR may forward the signal without decoding the signal, for example. An example of an NCR is an analog amplify-and-forward repeater. For example, the NCR may receive a signal, amplify the signal in an analog domain (e.g., in an intermediate frequency (IF) domain), and forward the signal (e.g., going from the IF domain to the RF domain) without digital processing (e.g., decoding) on the received signal. In some aspects, the NCR may be a digital repeater or an analog repeater, and this disclosure is not limited in this regard. For example, the NCR may be a repeater device that may or may not perform digital processing of the received signal. In the UL direction, the NCR-Fwd 4044 may receive a UL signal from the UE 406 and forward (and possibly amplify) the UL signal to the base station 402. The NCR 404 may be used to extend the coverage area of the base station 402. The base station 402 may or may not have direct control on the DL/UL transmission (Tx) power (i.e., DL/UL output power) of the NCR 404 (or, more specifically, NCR-Fwd 4044). FIG. 5 is a diagram 500 illustrating DL transmission power and received signal power at various stages of a DL transmission between a base station and a UE via an NCR. In the example shown in FIG. 5, when a base station 502 sends, through an NCR 504, a DL signal to a UE 506, the post-beam-forming transmission power (Tx) power at the base station 502 ($P_{TX}^{gNB}$) may be based on:

$$P_{TX}^{gNB} = G_{gNB} \cdot (N_{RB}^{DL} \cdot p_{DL}) \tag{1}$$

where $G_{gNB}$ is the beam-forming gain to the DL signal, $N_{RB}^{DL}$ is the total number of DL RB, and $p_{DL}$ is DL power spectrum density per RB (assuming a uniform power density). The post-beam-forming receive (Rx) power at the NCR 504 ($P_{RX,DL}^{NCR}$) may be represented as:

$$P_{RX,DL}^{NCR} = \frac{P_{TX}^{gNB} \cdot G_{NCR,BH}}{PL_{BH}} \tag{2}$$

where $G_{NCR,BH}$ is the receive beam-forming gain of the NCR 504, and $PL_{BH}$ is the path loss from the base station 502 to the NCR 504. The NCR 504 may amplify the received DL signal and transmit the amplified DL signal to the UE 506. The output power of the NCR 506 ($P_{TX,DL}^{NCR'}$) may be represented as:

$$P_{TX,DL}^{NCR'}=\min(P_{TXmax,DL}^{NCR},G_{max,DL}\cdot P_{RX,DL}^{NCR}) \qquad (3)$$

where $P_{TXmax,DL}^{NCR}$, DL is the NCR 504's maximum DL output power, and $G_{max,DL}$ is the NCR 504's maximum DL output gain. After amplifying the DL signal, the NCR 504 may create a transmit (Tx) beam and transmit the amplified DL signal to the UE 506 using the Tx beam. The post-beam-forming transmit (Tx) power at the NCR 504 ($P_{TX,DL}^{NCR}$) may be represented as:

$$P_{TX,DL}^{NCR}=G_{NCR,AC}\cdot P_{TX,DL}^{NCR'} \qquad (4)$$

where $G_{NCR,AC}$ is the NCR 504's transmit beam-forming gain. When the UE 506 received the amplified DL signal from the NCR 504, the received power on the UE 506 ($P_{RX}^{UE}$) may be represented as:

$$P_{RX}^{UE} = \frac{P_{TX,DL}^{NCR} \cdot G_{UE}}{PL_{AC}} \qquad (5)$$

where $G_{UE}$ is UE 506's receive beam-forming gain, and $PL_{AC}$ is the path loss from the NCR 504 to the UE 506.

Figure 6:
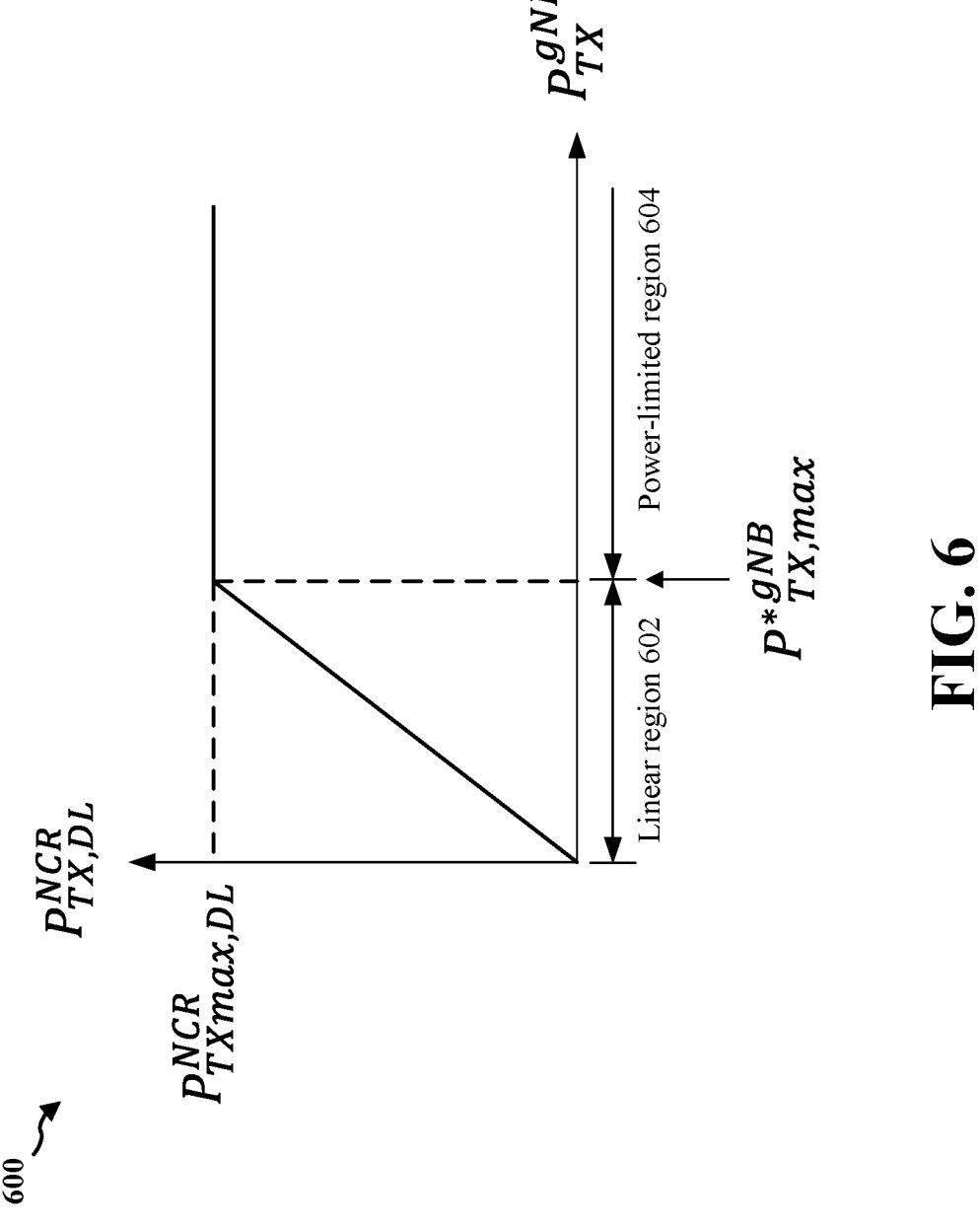
FIG. 6 is a diagram illustrating an NCR's output power in a DL transmission in an access network.

As shown in Equation (3), the DL output power of the NCR 504 is limited by the NCR's maximum DL output power $P_{TXmax,DL}^{NCR}$ and maximum DL gain $G_{max,DL}$. FIG. 6 is a diagram 600 illustrating an NCR's output power. As shown in FIG. 6, when the transmit power of the base station 502 ($P_{TX}^{gNB}$) is less than a power threshold (i.e., $P^*_{TX,max}^{gNB}$), the DL output power of the NCR 504 ($P_{TX,DL}^{NCR}$) has an approximately linear relationship with the base station 502's transmit power. In this case, the NCR 504 works in a linear region 602. When the transmit power of the base station 502 is larger than the power threshold ($P^*_{TX,max}^{gNB}$), the NCR's DL output power is capped at a maximum value $P_{TXmax,DL}^{NCR}$. In this case, the NCR 504 forwards communication in a power-limited region 604, which may also be referred to as a flat region. As shown in FIG. 6, when operating in the power-limited region 604, the NCR 504's DL output power remains substantially constant, independent of the base station's transmit power ($P_{TX}^{gNB}$). Hence, when the base station 502 increases the transmit power by, for example, allocating more RBs for the DL signal, the effective DL power spectrum density (PSD) drops linearly with the RB allocation. The increased transmission power at the base station without a corresponding increase at the NCR may adversely affect the quality of the DL communication, especially for those signals that need to maintain constant EPRE for downlink RSs, such as SSB and/or CSI-RS used for mobility.

This disclosure presents power control methods for communication via an NCR that enable a base station to control the transmission power of the NCR more effectively. Aspects of the methods may be performed by a network node. The network node may be the base station 102, or a component of a base station, in the access network of FIG. 1 or the network entity 1802 in FIG. 18. The method may include transmitting, by the network node, to an NCR, a DL signal, wherein the NCR is configured to amplify the DL signal and transmit the amplified DL signal to a UE; determining, by the network node, an operating region of the NCR when amplifying the DL signal, wherein the operating region is one of a power-limited region 604, in which the DL output power of the NCR reaches a maximum DL output power, and a linear region 602, in which the DL output power of the NCR is less than the maximum DL output power; and adjusting, by the network node, the DL output power of the NCR to cause the NCR to operate at the linear region 602 when amplifying the DL signal. The method provides DL/UL power control on the NCR, which improves the energy efficiency of the NCR when transmitting DL/UL signals.

FIG. 7 is a call flow diagram 700 illustrating a method of power control for communication via an NCR in accordance with various aspects of the present disclosure. The base station 702 may be the base station 102 or a component of a base station, in the access network of FIG. 1 or the network entity 1802 in the hardware implementation of FIG. 18. In the example of FIG. 7, for ease of description, a base station 702 is used as an example of the network node, and the aspects performed by the base station 702 may be performed by a network node that corresponds to the base station 702 in aggregated form, or that corresponds to one or more components of a disaggregated base station such as the CU 110, DU 130, and/or RU 140 described in connection with the base station 102 in FIG. 1.

As shown in FIG. 7, a base station 702 may transmit (at 708) a DL signal to an NCR 704. For example, the DL signal may be one of the following: PDCCH, PDSCH, or a DL reference signal, such as the SSB, CSI-RS, tracking reference signal (TRS), or positioning reference signal (PRS). The NCR 704 may be configured to amplify the DL signal and transmit, at 710, the amplified DL signal to a UE 706. At 712, the base station 702 may determine an operating region of the NCR 704 when amplifying the DL signal. At 714, the base station 702 may adjust the DL output power of the NCR 704 based on the operating region of the NCR 704 to cause the NCR 704 to operate at the linear region 602 when amplifying the DL signal. Then, the base station may transmit the DL signal 717 to the NCR to be forwarded to the UE at 718 based on the adjustment.

In some aspects, the base station 702 may determine that even when the base station 702 transmits, at 708, the DL signal with the maximum output power ($P_{TX,max}^{gNB}$), the NCR 704 still operates in the linear region 602 (i.e., $P_{TX,max}^{gNB}<P^*_{TX,max}^{gNB}$). In such aspects, the NCR 704 does not operate in the power-limited region 604. In some aspects, the base station 702 may determine that the NCR 704 may possibly operate in the power-limited region 604. When the NCR 704 operates in the power-limited region 604, increasing the RB allocation may lead to a smaller effective DL PSD observed at the UE (assuming the DL PSD at the base station 702 remains constant). Hence, the base station 702 may limit its output power, at 714, to be not more than the power threshold $P^*_{TX,max}^{gNB}$ to cause the NCR 704 to operate at the linear region 602. For example, the adjustment at 714 may include an adjustment to the output power of the base station 702. For example, if the output power of the base station 702 is larger than that power threshold $P^*_{TX,max}^{gNB}$, i.e., $P_{TX}^{gNB}=G_{gNB}\cdot(N_{RB}^{DL}\cdot p_{DL})>P^*_{TX,max}^{gNB}$ (where $NB_{RB}^{DL}$ is a given RB allocation, and $p_{DL}$ is the base station's DL PSD), the base station 702 may reduce its output power down to $P^*_{TX,max}^{gNB}$, by, for example, reducing the DL PSD ($p_{DL}$) or the RB allocation ($N_{RB}^{DL}$), to cause the NCR 704 to operate in the linear region 602.

The base station 702 may determine, at 712, the operating region of the NCR 704 in various ways. In some aspects, the base station 702 may determine the operating region of the NCR 704 (and accordingly adjust its own output power and schedule) via one or more reports 711 received from the NCR 704. In some aspects, a report 711 the base station 702 receives from the NCR 704 may include the NCR 704's maximum DL output power ($P_{TXmax,DL}{}^{NCR}$) and the NCR 704's maximum DL output gain ($G_{max,DL}$) The base station 702 may receive the report 711 from the NCR 704 along with NCR-MT 4042's measurements/reports. Additionally, or alternatively, the NCR-MT 4042 may report, at 711, to the base station 702 measured wideband RF power received by the NCR-Fwd 4044.

In some aspects, the report 711 the base station 702 receives from the NCR 704 may include an indicator indicating the NCR 704 is operating at one of the linear region 602 or the power-limited region 604. In some aspects, the indicator may be event-triggered. For example, the indicator may be triggered when the NCR 704 is operating at, or begins to operate at, the power-limited region 604. In some aspects, the indicator may be sent to the base station 702 periodically or aperiodically. In some aspects, the report may be associated with a particular beam, e.g., the report may be beam-specific. In some aspects, the NCR may provide different reports for different beams, e.g., reporting different parameters. In some aspects, the report 711 may be associated with a particular time occasion. For example, the NCR may indicate that the report is for a time interval such as a slot in which the NCR forwards a signal.

In some aspects, the reports the base station 702 received from the NCR 704 may include a power offset between the received power of the DL signal at the NCR 704 and an optimal power. The optimal power may be determined by the NCR 704 based on the maximum DL output gain and the maximum DL output power of the NCR 704.

Figure 8:
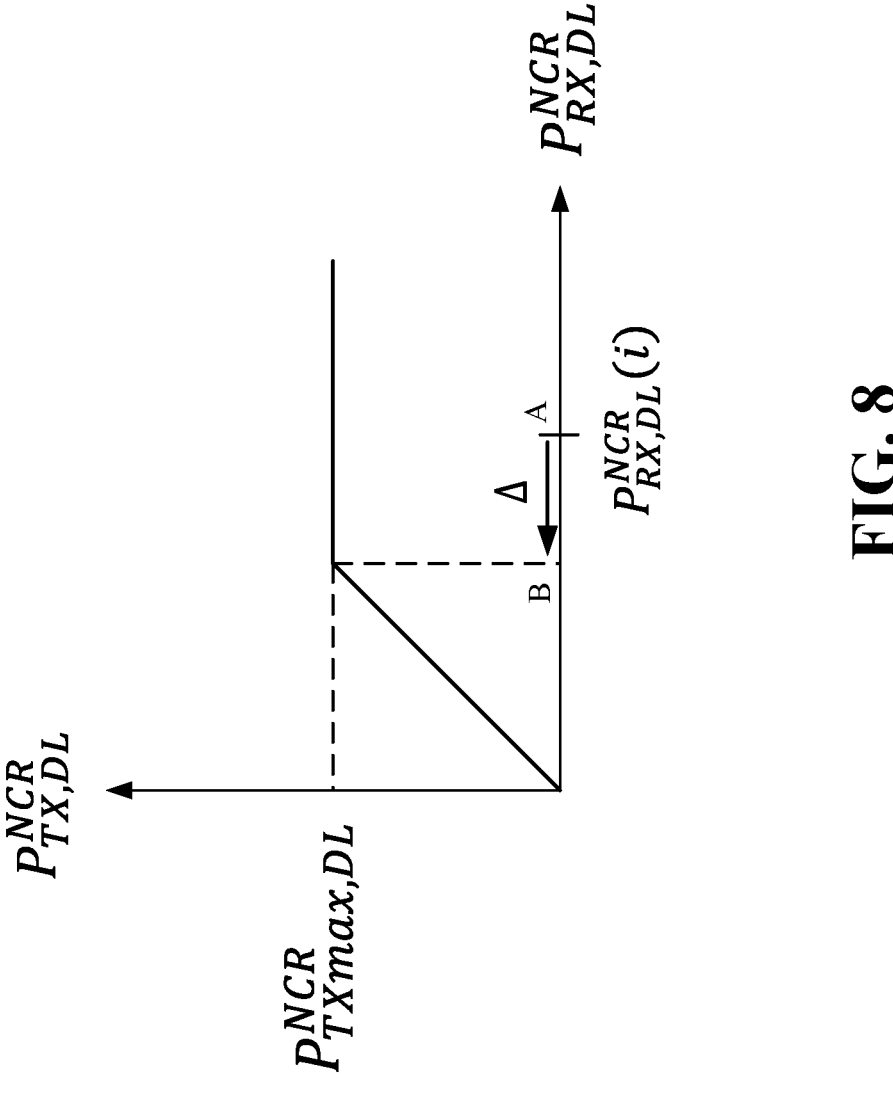
FIG. 8 is a diagram illustrating a power offset in a method of power control of an NCR in accordance with various aspects of the present disclosure.

FIG. 8 is a diagram 800 illustrating a power offset in a method of power control of an NCR in accordance with various aspects of the present disclosure. As shown in FIG. 8, in one occasion (i), the received power of the DL signal on the NCR 704 may be $P_{RX,DL}{}^{NCR}$(i), as shown in point A in FIG. 8. The NCR 704 may determine an optimal power at point B. The optimal power may be a threshold power for the received power of the DL signal at the NCR 704. When the received power of a DL signal is less than the threshold power, the NCR 704 may operate at the linear region 602. The optimal power may be determined based on the maximum DL output power of the NCR 704 and the maximum DL gain of the NCR 704. The power offset Δ may be the power difference between the received power of the DL signal and the optimal power, as shown in FIG. 8.

In some aspects, the base station 702 may determine the operating region of the NCR 704 via a trial-and-error approach. That is, the base station 702 may transmit, through the NCR 704, to one or more UEs 706 a plurality of test signals. As an example, the downlink signals shown at 708 may include one or more test signals. Each of the plurality of test signals may be associated with one of a plurality of transmission settings different from each other. For example, the test signals may be associated with different RB allocations or different DL transmit powers. The base station 702 may collect multiple measurements from the UE 706, which are associated with the plurality of test signals, and determine the operating region of the NCR 704 based on the multiple measurements. As an example, the uplink signals (e.g., 713 and 715) from the UE may include the measurement information for the DL test signals transmitted by the base station 702.

After the base station 702 determines, at 712, the operating region of the NCR 704, the base station 702 may adjust the DL output power of the NCR 704. The base station 702 may adjust the output power of the NCR 704 via various ways, depending on whether the base station 702 has direct control over the DL output power of the NCR 704.

In some aspects, the base station 702 may not have direct control over the DL output power of the NCR 704. In that case, the base station 702 may adjust the DL output power of the NCR 704 by adjusting the transmit power of the DL signal (e.g., 717) at the base station 702.

In some aspects, the base station 702 may have direct control on the DL output power of the NCR 704. In that case, the base station 702 may indicate new operating limits, such as a new maximum DL output gain and a new maximum output power of the NCR 704, e.g., as shown at 716. The NCR 704 (or, more specifically, the NCR-Fwd 4044) may set its output power to a maximum value subject to new maximum output power and new maximum output gain. That is, $$P_{TX,DL}{}^{NCR}=\min(\hat{P}_{TXmax,DL}{}^{NCR},\overline{G}_{max,DL}\cdot P_{RX,DL}{}^{NCR}) \qquad (6)$$

where $\hat{P}_{TXmax,DL}{}^{NCR}$ is NCR 704's original maximum DL output power, and $\overline{G}_{max,DL}$ is NCR 704's original maximum DL output gain. The base station 702 may indicate new limits: $\hat{P}_{TXmax,DL}{}^{NCR}$ and/or $\hat{G}_{max,DL}$. Then, the NCR 704 may set its output power limit as:

$$P_{TX,DL}{}^{NCR}=\min(P_{TXmax,DL}{}^{NCR},G_{max,DL}\cdot P_{RX,DL}{}^{NCR}) \qquad (7)$$

where $P_{TXmax,DL}{}^{NCR}=\min(\overline{P}_{TXmax,DL}{}^{NCR},\hat{P}_{TXmax,DL}{}^{NCR})$, and $G_{max,DL}=\min(\overline{G}_{max,DL},\hat{G}_{max,DL})$. The base station 702 may already know the NCR's original power limitations (i.e., $\overline{P}_{TXmax,DL}{}^{NCR}$ and $\overline{G}_{max,DL}$). Hence, the base station 702 may set new limits that are smaller than the original limits (i.e., a $\hat{P}_{TXmax,DL}{}^{NCR}<\overline{P}_{TXmax,DL}{}^{NCR}$ and $\hat{G}_{max,DL}<\overline{G}_{max,DL}$).

Figures 9A, 9B:
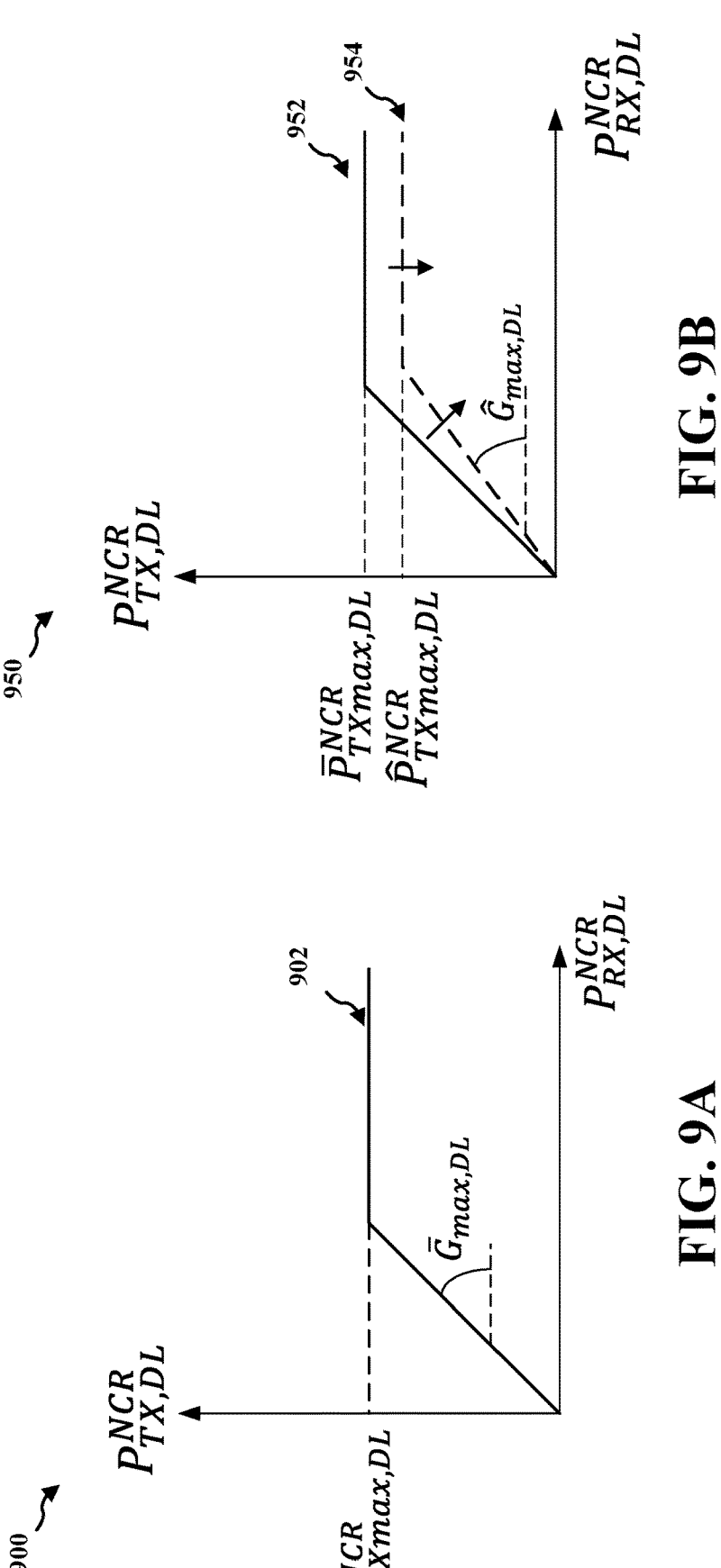
FIGS. 9A and 9B are diagrams illustrating the output power of an NCR with adjustments of power limits in absolute values in accordance with various aspects of the present disclosure.

In some aspects, the indication of the new power limits may be provided as absolute values of these limits (i.e., $\hat{P}_{TXmax,DL}{}^{NCR}$, $\hat{G}_{max,DL}$) FIGS. 9A and 9B are diagrams illustrating the output power of an NCR with adjustments of power limits in absolute values in accordance with various aspects of the present disclosure. FIG. 9A is a diagram 900 that shows the output power of an NCR under the original power limits. As shown in FIG. 9A, the NCR 704 may have original maximum DL output power of $\overline{P}_{TXmax,DL}{}^{NCR}$, and original maximum DL output gain of $\overline{G}_{max,DL}$. The line 902 represents the maximum DL output power the NCR 704 may achieve under different received power of the DL signals ($P_{RX,DL}{}^{NCR}$), or, equivalently, under different transmit power of the base station 702 ($P_{TX}{}^{gNB}$). FIG. 9B is a diagram 950 that shows the output power of the NCR under the new limits. As shown in FIG. 9B, the base station 702 may provide a new maximum DL output power ($\hat{P}_{TXmax,DL}{}^{NCR}$) and a new maximum DL output gain ($\hat{G}_{max,DL}$), and the NCR may operate under the new power limits (represented by line 954) the base station provides, e.g., that is lower than 952.

In some aspects, the indication of the new power limits may be provided as relative adjustments ($\Delta_{Pmax}$ and/or $\Delta_{Gmax}$) with respect to the existing limits. The existing limits may be the NCR 704's own limits (i.e., $\overline{P}_{TXmax,DL}{}^{NCR}$ and $\overline{G}_{max,DL}$), the NCR 704's current limits ($P_{TXmax,DL}{}^{NCR}$, $G_{max,DL}$) or previously indicated ($\hat{P}_{TXmax,DL}{}^{NCR}$, $\hat{G}_{max,DL}$).

Figures 10A, 10B:
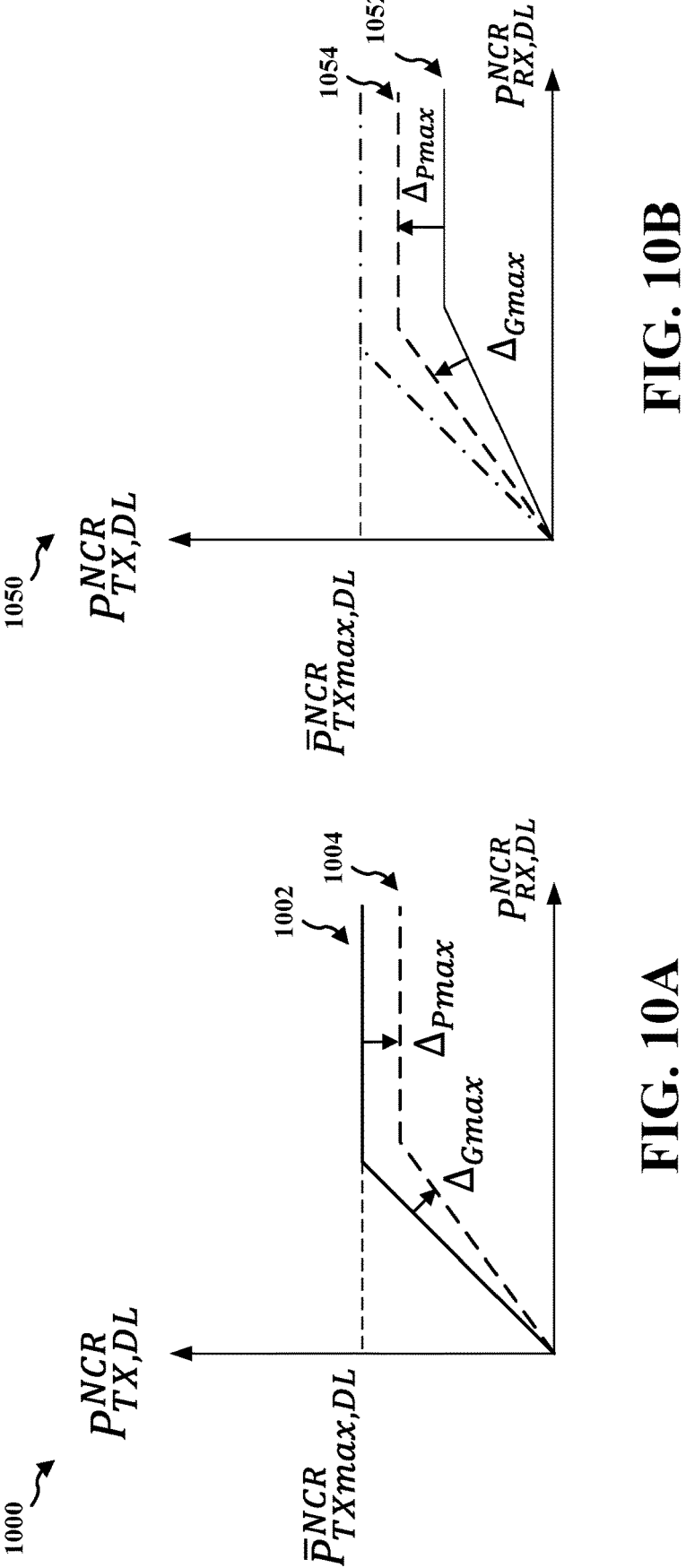
FIGS. 10A and 10B are diagrams illustrating the output power of an NCR with adjustments of power limits in relative values in accordance with various aspects of the present disclosure.

FIGS. 10A and 10B are diagrams illustrating the output power of an NCR with adjustments of power limits in relative values in accordance with various aspects of the present disclosure.

FIG. 10A is a diagram 1000 that shows the change of output power with the relative adjustments with respect to the NCR's own limits ($\hat{P}_{TXmax,DL}{}^{NCR}$ and $\overline{G}_{max,DL}$). As shown in FIG. 10A, the relative adjustments to the maximum DL output power and the maximum DL output gain ($\Delta_{Pmax}$ and/or $\Delta_{Gmax}$) may be provided with respect to NCR's own limits ($\overline{P}_{TXmax,DL}{}^{NCR}$ and $\overline{G}_{max,DL}$), and the NCR 704 may operate under the adjusted power limits (represented by line 1004, which is adjusted from line 1002) after applying the adjustments. The information about the NCR's original limits ($\overline{P}_{TXmax,DL}{}^{NCR}$ and $\overline{G}_{max,DL}$) may be provided to the base station 702 beforehand. The NCR 704's original limits ($\overline{P}_{TXmax,DL}{}^{NCR}$ and $\overline{G}_{max,DL}$) may change due to, for example, the change of environment.

FIG. 10B is a diagram 1050 that shows the change of output power with the relative adjustments with respect to the NCR's current limits ($P_{TXmax,DL}{}^{NCR}$, $G_{max,DL}$) or previously indicated limits ($\hat{P}_{TXmax,DL}{}^{NCR}$, $\hat{G}_{max,DL}$). As shown in FIG. 10B, the relative adjustments ($\Delta_{Pmax}$ and/or $\Delta_{Gmax}$) may be made with respect to the NCR's current limits ($\hat{P}_{TXmax,DL}{}^{NCR}$, $G_{max,DL}$) or previously indicated limits ($\hat{P}_{TXmax,DL}{}^{NCR}$, $\hat{G}_{max,DL}$). The NCR may operate under the adjusted limits (represented by line 1054 that is adjusted from line 1052) after applying the adjustments. A base station 702 may or may not know the current limits or previously indicated limits. Hence, it is possible that the adjusted power limits may be beyond the NCR's operation range (i.e., the adjusted values may be too high or too low) or the limits set by the base station 702. In that case, the NCR 704 may provide feedback to the base station 702, indicating that the adjustments are infeasible. As described above, when the base station 702 provides new operating limits to the NCR 704, the base station 702 may not know the received power ($P_{RX,DL}{}^{NCR}$) of the DL signal at the NCR 704 (i.e., the adjusted operating limits are independent of the received power ($P_{RX,DL}{}^{NCR}$)). However, the base station 702 may know the NCR 704's original operating limits or current operating limit to avoid infeasible adjustments.

When indicating the new operating limits or adjustments to the NCR 704, e.g., at 716, the indication may be dynamic or semi-static. In some aspects, the new operating limits or adjustments may be implemented with dynamic indication and/or through a configuration. For example, for an upcoming operation by the NCR 704 to transmit a signal (e.g., forward operation), the power control (PC) information for the forward operation, which may include new operating limits or adjustments, may be provided to the NCR 704 along with other control information for the forward operation.

In some aspects, the new operating limits or adjustments to the NCR 704 may be implemented with a semi-persistent configuration and/or a dynamic indication. For example, the base station 702 may provide the PC information including the new operating limits or adjustments to the NCR 704 at any time, and the PC information may be applicable to all upcoming forward operations until a new PC information is provided to overwrite the current PC information.

In some aspects, the new operating limits or adjustments may be implemented with a semi-static configuration and an indication. For example, the base station 702 may provide one or more PC information including the new operating limits or adjustments to the NCR 704, which may be respectively associated with one or more sets of resources. In one example, the base station 702 may provide two sets of PC information to the NCR 704, with the first set of PC information associated with even slots, and the second set of PC information associated with odd slots.

In some aspects, the new operating limits or adjustments may be implemented with channel-specific configuration.

For example, the base station 702 may provide one or more PC information including the new operating limits or adjustments to the NCR 704, which may be respectively associated with one or more specific signal/channel types (e.g., SSB/CSI-RS/TRS, random access channel (RACH)).

In some aspects, the new operating limits or adjustments of the NCR 704 may be implemented with a combination of dynamic and semi-static adjustments. For example, the base station 702 may set the maximum output DL gain of the NCR 704 for the occasion i with the formula of:

$$G_{max,DL}(i)=\min(\overline{G}_{max,DL}+\Delta_{Gmax}+\delta_{Gmax}(i),\overline{G}_{max,DL}) \qquad (8)$$

where $\overline{G}_{max,DL}$ is the NCR 704's original maximum DL output gain, $\Delta_{Gmax}$ is the semi-static adjustment the NCR 704 received, and $\delta_{Gmax}(i)$ is the dynamic adjustment the NCR 704 received. As shown in Equation (8), the maximum DL output gain ($G_{max,DL}(i)$) depends on both the dynamic adjustment ($\delta_{Gmax}(i)$) and the semi-static adjustment ($\Delta_{Gmax}$). The same principle may be applicable to the settings of maximum DL output power ($P_{TXmax,DL}{}^{NCR}(i)$) of the NCR 704.

Additionally, when setting the new operating limits or adjustments of the NCR 704, the PC information including the new operating limits or adjustments may be beam-specific and/or frequency-specific. For example, different PC information may be applicable to the NCR 704 when different transmit (Tx) and/or receive (Rx) beams are used. If the NCR 704 supports narrow-band forwarding/filtering, different PC information may be applicable to the NCR 704 when transmitting signals on different frequency bands. Additionally, different PC information may be applicable to the NCR 704 when transmitting signals on different occasions (e.g., different slots). For example, the PC information may be beam-specific, and/or may be associated with different time occasions, such as a slot in which the NCR forwards a signal.

Figures 11A, 11B:
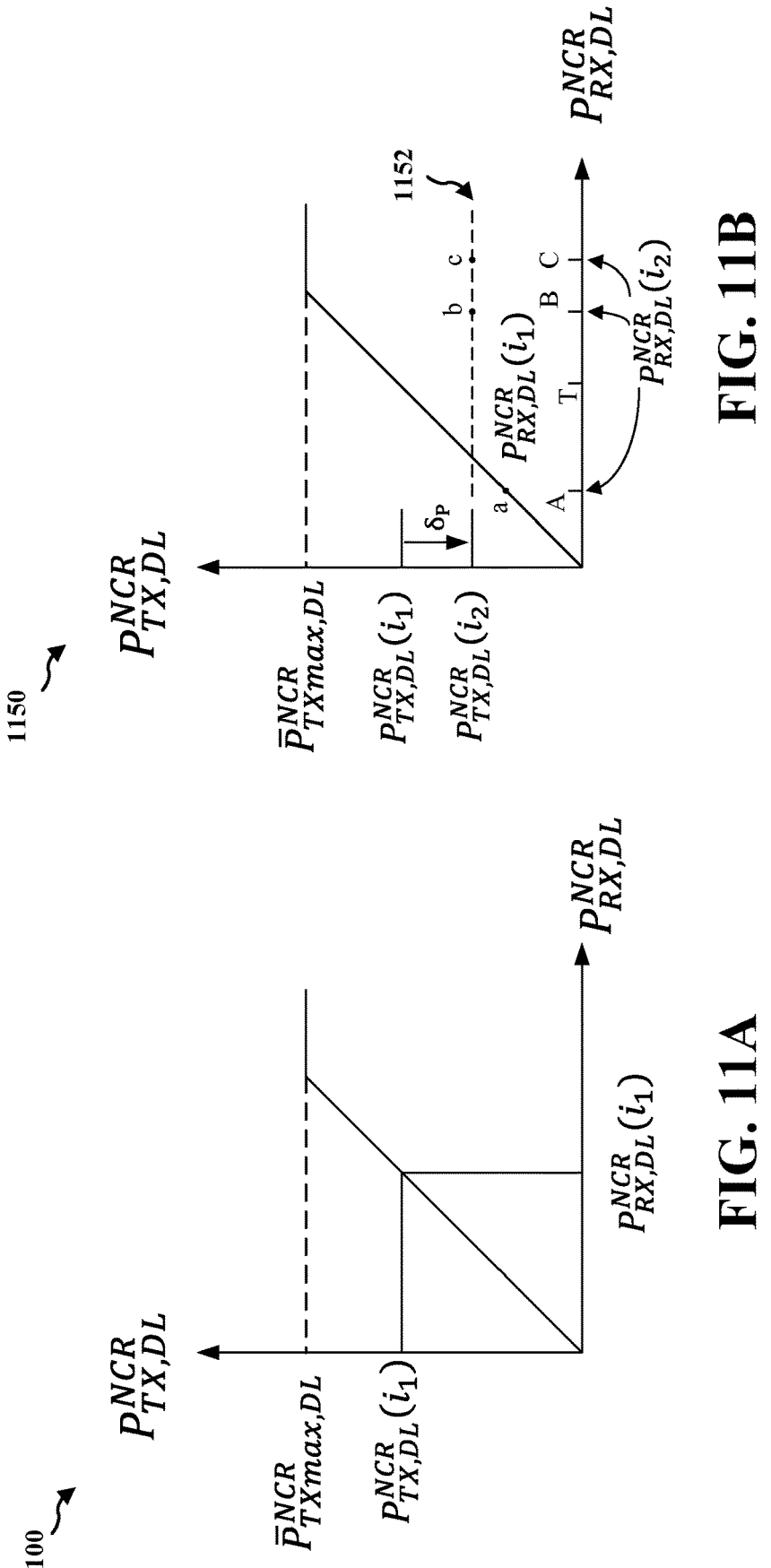
FIGS. 11A and 11B are diagrams illustrating the output power of an NCR with adjustments to the output power in accordance with various aspects of the present disclosure.

Other than indicating new operating limits or adjustments, the base station 702 may also adjust the DL output power of the NCR 704 by indicating a required/desired adjustment to the DL output power of the NCR 704. FIGS. 11A and 11B are diagrams illustrating the output power of an NCR with adjustments to the output power in accordance with various aspects of the present disclosure. As shown in the diagram 1100 in FIG. 11A, in occasion $i_1$, the received power of a DL signal at the NCR 704 is $P_{RX,DL}{}^{NCR}(i_1)$, the corresponding output power of the DL signal at the NCR 704 is $P_{TX,DL}{}^{NCR}(i_1)$, and $$P_{TX,DL}{}^{NCR}(i_1)=\min(\overline{P}_{TXmax,DL}{}^{NCR},\overline{G}_{max,DL}\cdot P_{RX,DL}{}^{NCR}(i_1)) \qquad (9)$$

The base station 702 may request an adjustment $\delta_P$ on the output power to the NCR 704 for occasion $i_2$. Accordingly, the NCR 704 may adjust its DL output power for occasion $i_2$ may be:

$$P_{TX,DL}{}^{NCR}(i_2)=\min(P_{TX,DL}{}^{NCR}(i_1)+\delta_P,\overline{P}_{TXmax,DL}{}^{NCR},\overline{G}_{max,DL}\cdot P_{RX,DL}{}^{NCR}(i_2)) \qquad (10)$$

The actual DL output power of the NCR 704 at occasion $i_2$ depends on the received power of the DL signal at the occasion $i_2$. FIG. 11B shows a diagram 1150 indicating the adjustment of the output power of the NCR 704 in accordance with various aspects of the present disclosure. As shown in FIG. 11B, since the base station 702 indicates a desired adjustment of the DL output power of the NCR 704 ($\delta_P$), the desired DL output power for occasion $i_2$ is indicated by the horizontal line 1152. However, the actual DL output power of the NCR 704 at occasion $i_2$ may depend on the received power of the DL signal at occasion $i_2$ $(P_{RX,DL}{}^{NCR}(i_2))$. FIG. 11B shows three examples of different received powers of the DL signal at occasion $i_2$. In the first example (point A), the received power of the DL signal at occasion $i_2$ is less the received power at occasion $i_1$ (point T). As shown in FIG. 11B, even if the NCR 704 operates at the maximum DL output gain, the DL output power cannot reach the desired DL output power. In this case, the actual DL output power is limited at: $P_{TX,DL}{}^{NCR}(i_2) = \overline{G}_{max,DL} \cdot P_{RX,DL}{}^{NCR}(i_2)$, as shown in point a (assuming the NCR operates at the maximum DL output gain $\overline{G}_{max,DL}$). In the second and the third examples (points B and C), the received powers of the DL signal at occasion $i_2$ are sufficiently large to allow the NCR 704 to generate the DL output power larger than the desired output power $(P_{TX,DL}{}^{NCR}(i_1) + \delta_P)$. In that case, the actual DL output power of the NCR 704 is limited at: $(P_{TX,DL}{}^{NCR}(i_1) = (P_{TX,DL}{}^{NCR}(i_1) + \delta_P$, as shown in points b and c.

The adjustment to the DL output power of the NCR 704 may be indicated with reference to the DL output power of various reference occasions. In some aspects, the reference occasion may be the latest transmit occasion of the NCR 704. In some aspects, the reference occasion may be identified via slot index, slot offset, or beam index.

Similar to the indication of new operating limits or adjustments, as described above, the indication of the adjustment to the DL output power may be dynamic or semi-static. That is, when implementing the adjustment to the DL output power, the implementation may be performed with dynamic configuration and indication, with semi-persistent configuration and dynamic indication, with semi-static configuration and indication, or with channel-specific configuration. Relevant parts for implementing the new operating limits or adjustments may be referred to for details, which are not repeatedly described here for the sake of conciseness.

Additionally, the DL power control of the NCR 704 may be implemented by a combination of the methods described above. For example, the base station 702 may indicate, to the NCR 704, new operating limits or adjustment, as well as the desired adjustment to the DL output power. The NCR 704 may operate under the new operating limits/adjustment and the desired DL output power after applying adjustments.

Figure 12:
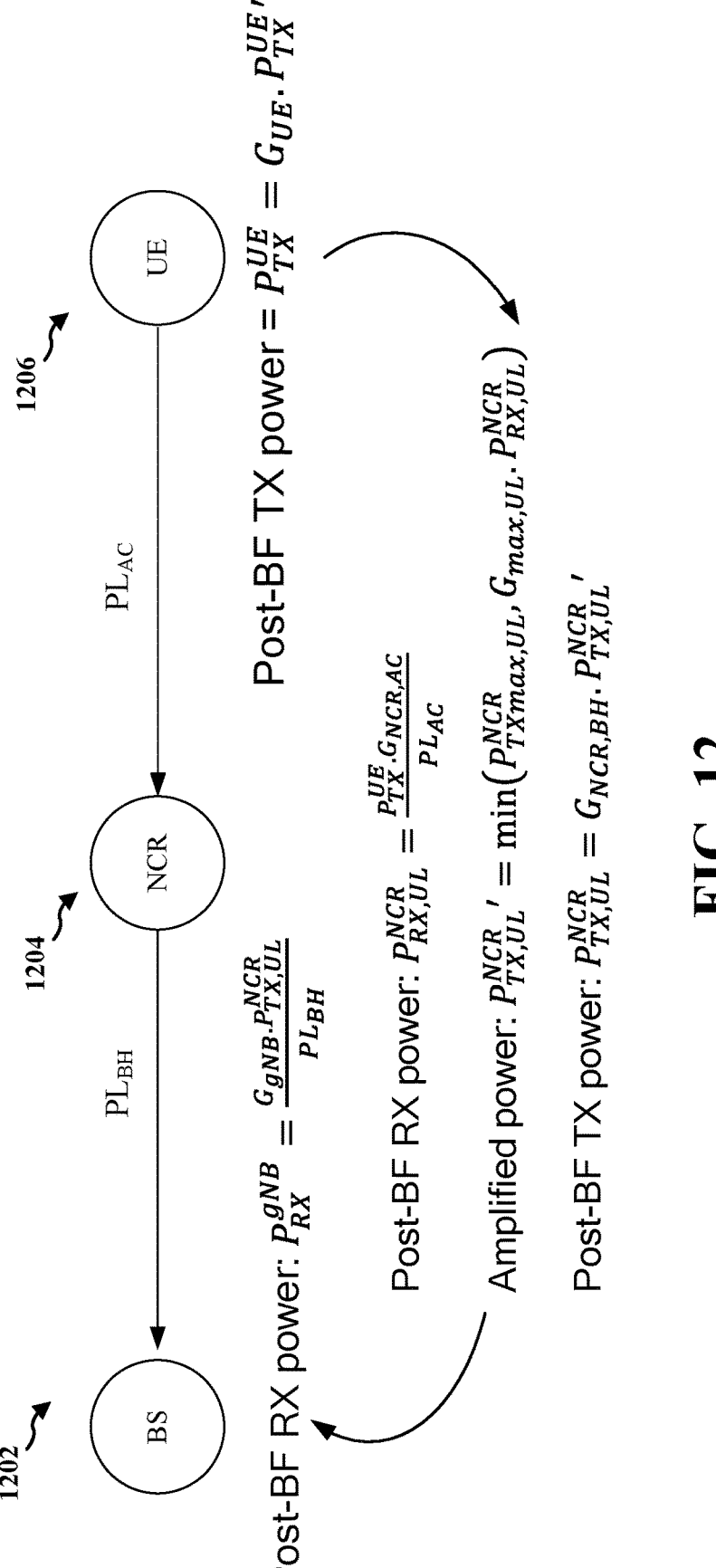
FIG. 12 is a diagram illustrating uplink power at various stages of a UL transmission of an access network.

Although examples are described for DL communication to illustrate the concept, the power control aspects for wireless communication via the NCR 704, as described above, are also applicable to UL communication. FIG. 7 illustrates that the adjustment at 714 may be determined for uplink communication, and the UE 706 may provide an uplink signal 720 to be forward to the base station at 722, based on the adjustment. FIG. 12 is a diagram illustrating UL power at various stages of a UL transmission of an access network. For example, in FIG. 7, the UE 706 may transmit an uplink signal 713 that is forwarded by the NCR 704 to the base station 702, at 715. As shown in FIG. 7, the determination about the operating region of the NCR, at 712, and the adjustment, at 714, may be for the UL signal. In the example shown in FIG. 12, a UE 1206 may send, through an NCR 1204, a UL signal to a base station 1202. The post-beam-forming transmission power (Tx) of at the UE 1206 is $P_{TX}{}^{UE}$. The post-beam-forming receive (Rx) power at the NCR 1204 $(P_{RX,UL}{}^{NCR})$ is:

$$P_{RX,UL}^{NCR} = \frac{P_{TX}^{UE} \cdot G_{NCR,AC}}{PL_{AC}} \tag{11}$$

wherein $G_{NCR,AC}$ is the NCR's receive beam-forming gain, and $PL_{AC}$ is the path loss from the UE 1206 to the NCR 1204. The NCR 1204 may amplify the received UL signal and transmit the amplified UL signal to the base station 1202. The UL output power of the NCR 1204 $(P_{TX,UL}{}^{NCR'})$ may be represented as:

$$P_{TX,UL}^{NCR'}(i) = \min(P_{TXmax,UL}^{NCR}, G_{max,UL} \cdot P_{RX,UL}^{NCR} \atop (i_1)) \tag{12}$$

wherein $(P_{TXmax,UL}{}^{NCR}$ is the NCR's maximum UL output power, and $G_{max,UL}$ is the NCR's maximum UL output gain. After amplifying the UL signal, the NCR 1204 may create a transmit (Tx) beam and transmit the amplified UL signal to the UE 1206 through the Tx beam. The post-beam-forming transmit (Tx) power at the NCR 1204 $(P_{TX,DL}{}^{NCR})$ may be represented as:

$$P_{TX,UL}^{NCR} = G_{NCR,BH} \cdot P_{TX,UL}^{NCR'} \tag{13}$$

where $G_{NCR,BH}$ is the NCR's transmit beam-forming gain. When the base station 1202 receives the amplified UL signal from the NCR 1204, the received power on the base station 1202 $(P_{RX}{}^{gNB})$ may be represented as:

$$P_{RX}^{gNB} = \frac{G_{gNB} \cdot P_{TX,UL}^{NCR}}{PL_{BH}} \tag{14}$$

where $G_{gNB}$ is the base station's receive beam-forming gain, and $PL_{BH}$ is the path loss from the NCR 1204 to the base station 1202.

Figure 13:
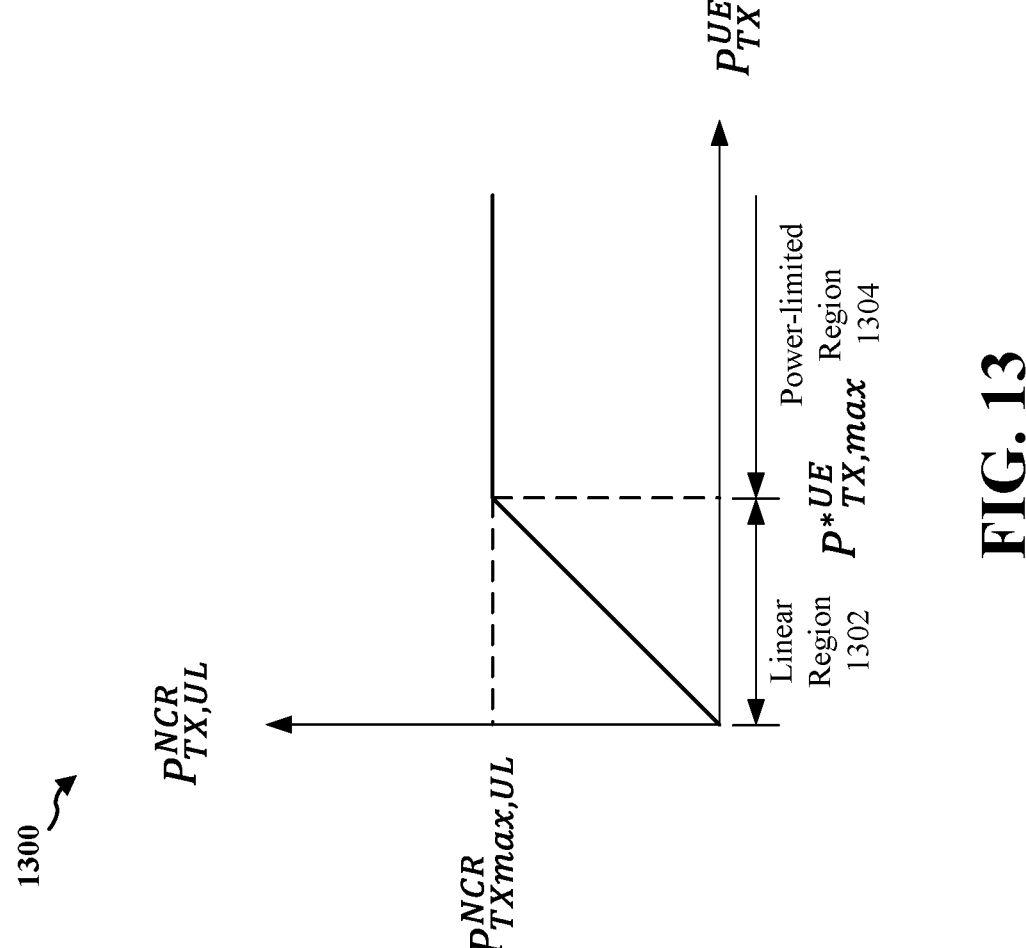
FIG. 13 is a diagram illustrating an NCR's operating regions in a UL transmission in an access network.

Similar to the scenarios of transmitting DL signals, the NCR 1204 that transmits UL signals may work in a linear region or a power-limited region, depending on the transmit power of the UL signal at the UE 1206, or, equivalently, the received power of the UL signals at the NCR 1204. FIG. 13 is a diagram 1300 illustrating the NCR 1204's operating regions in a UL transmission in an access network. As shown in FIG. 13, the operating regions of the NCR 1204 when transmitting a UL signal is similar to the operating regions of the NCR 504 when transmitting a DL signal, as shown in FIG. 6, except that the operating region of the NCR 1204 when transmitting a UL signal depends on the transmit power of the UE 1206 $(P_{TX}{}^{UE})$. That is, when the transmit power of the UE 1206 $(P_{TX}{}^{UE})$ is less than a power threshold $(P^*_{TX,max}{}^{UE})$, the UL output power of the NCR 1204 $(P_{TX,UL}{}^{NCR})$ has an approximately linear relationship with the UE 1206's transmit power. In this case, the NCR 1204 works in a linear region 1302. When the UE 1206's transmit power is larger than the power threshold $(P^*_{TX,max}{}^{UE})$, the NCR 1204's UL output power is capped at a maximum value $(P_{TXmax,UL}{}^{NCR})$. In this case, the NCR 1204 works at a power-limited region 1304, which may also be referred to as a flat region. The principle for power control for DL transmission of the NCR 504 is applicable to the UL transmission of the NCR 1204.

In a UL transmission of a UL signal from a UE 1206 to a base station 1202 through an NCR 1204, the base station 1202 may determine the operating region of the NCR 1204 when amplifying the UL signal. If the base station 1202 determines that, even when NCR 1204 transmits the UL signal with the maximum UL output power, the NCR 1204 still operates in the linear region 1302. No action may be needed, as the NCR 1204 does not operate in the power-limited region 1304. On the other hand, if base station 1202 determines that the NCR 1204 may possibly operate in the power-limited region 1304 when the UE 1206 operates at the maximum UL output power, the base station 1202 may adjust the UE 1206's UL output power to allow more energy efficient UL transmission by the UE 1206. For example, at 717, the base station 702 may indicate an UL output power adjustment to the UE, which the UE may use when transmitting the UL signal 720.

The aspects used for DL power control for the NCR 504, as described above, are applicable for UL power control of the NCR 1204. For example, the NCR 1204 may provide UL power information via one or more reports 711 to the base station 1202. The UL power information may include, but not limited to, the maximum UL output power, maximum UL output gain, received RF power in the NCR 1204, and whether the NCR 1204 is operating at the gain-limited region or the linear region, and the power offset to the optimal UL power.

The base station 1202 may also determine the operating region of the NCR 1204 for UL transmission via a similar trial-and-error approach, or signal measurement approach, described for determining the operating region of the NCR 504 for DL transmission. That is, the base station 1202 may determine the operating region of the NCR 1204 for UL transmission through performing multiple measurements from multiple UE 1206's UL transmissions (e.g., 715) associated with different configurations.

The base station 1202 may control the UL output power of the NCR 1204 using the same methods used for controlling the DL output power of the NCR 504. Relevant description may be referred to for details, which are not repeatedly described here for the sake of conciseness.

FIG. 14 is a flowchart 1400 illustrating methods of power control of an NCR in accordance with various aspects of the present disclosure. The methods may be performed by a network node, which may also be referred to as a network entity. The network node may be a base station, or a component of a base station, in the access network of FIG. 1 or a core network component (e.g., base station 102, 310; CU 110; DU 130; RU 140; base station 402, 502, 702, 1202; or the network entity 1802 in the hardware implementation of FIG. 18). The NCR may be the NCR 404, 504, 704, 1204. The method provides DL/UL power control on the NCR, which improves the energy efficiency of the NCR when transmitting DL/UL signals.

As shown in FIG. 14, at 1402, the network node may transmit a DL signal to a wireless device. The wireless device may be an NCR. The NCR may be the NCR 404, 504, 704, 1204, and may be configured to amplify the DL signal and transmit the amplified DL signal to a UE. The UE may be the UE 104, 350, 406, 706, or the apparatus 1804 in the hardware implementation of FIG. 18. FIGS. 5 and 7 illustrate various aspects of a network node transmitting a DL signal to an NCR. As shown in FIG. 7, in one configuration, the network node (e.g., base station 702) may transmit, at 708, a DL signal to the wireless device (e.g., NCR 704). The NCR 704 may be configured to amplify the DL signal and transmit the amplified DL signal to a UE 706.

At 1404, the network node may determine an operating region of the wireless device when amplifying the DL signal. The operating region may be one of a power-limited region, in which the DL output power of the wireless device reaches the maximum DL output power, and a linear region, in which the DL output power of the wireless device is less than the maximum DL output power. For example, as shown in FIG. 7, the base station 702 may determine the operation region of the NCR 704. As shown in FIG. 6, in the linear region 602, the transmit power of the base station 502 ($P_{TX}^{gNB}$) is less than a power threshold (i.e., $P^*_{TX,max}^{gNB}$), and the DL output power of the NCR 504 ($P_{TX,DL}^{NCR}$) has an approximately linear relationship with the transmit power of the base station 502. In the power-limited region 604, the base station's transmit power is larger than the power threshold ($P^*_{TX,max}^{gNB}$), and the NCR's DL output power is capped at a maximum value ($P_{TXmax,DL}^{NCR}$.

At 1406, the network node may adjust the DL output power of the wireless device to cause the wireless device to operate at the linear region when amplifying the DL signal. For example, as shown in FIG. 7, the base station 702 may adjust the DL output power of the NCR 704 to cause the NCR 704 to operate at the linear region 602. FIGS. 8, 9A, 9B, 10A, 10B, 11A, and 11B illustrate various ways the base station 702 may adjust the DL output power of the NCR 704.

FIG. 15 is a flowchart 1500 illustrating methods of power control of an NCR in accordance with various aspects of the present disclosure. The methods may be performed by a network node, which may also be referred to as a network entity. The network node may be a base station, or a component of a base station, in the access network of FIG. 1 or a core network component (e.g., base station 102, 310; CU 110; DU 130; RU 140; base station 402, 502, 702, 1202; or the network entity 1802 in the hardware implementation of FIG. 18). The method provides DL/UL power control on the NCR, which improves the energy efficiency of the NCR when transmitting the DL/UL signals.

As shown in FIG. 15, at 1502, the network node may transmit a DL signal to a wireless device. The wireless device may be an NCR, and may be configured to amplify the DL signal and transmit the amplified DL signal to a UE. The NCR may be the NCR 404, 504, 704, 1204. The UE may be the UE 104, 350, 406, 706, or the apparatus 1804 in the hardware implementation of FIG. 18. FIGS. 5 and 7 illustrate various aspects of a network node transmitting a DL signal to an NCR. As shown in FIG. 7, in one configuration, the network node (e.g., base station 702) may transmit, at 708, a DL signal to the wireless device (e.g., NCR 704). The NCR 704 may be configured to amplify the DL signal and transmit the amplified DL signal to a UE 706. After the network node transmits the DL signal to the wireless device for the wireless device to amplify the DL signal, the network node may determine the operating region of the wireless device when amplifying the DL signals. The network node may determine the operating region via various ways.

In some aspects, the network node may determine the operating region through steps 1504 and 1506. At 1504, the network node may receive, from the wireless device, a maximum DL output gain of the wireless device, the maximum DL output power of the wireless device, and the received power of the DL signal at the wireless device. At 1506, the network node may determine, based on the maximum DL output gain, the maximum DL output power, and the received power, the operating region of the wireless device.

In some aspects, the network node may determine the operating region through 1508. At 1508, the network node may receive a status indicator, the status indicator indicating the operating region of the wireless device is one of the linear region and the power-limited region. In some aspects, the network node may receive the status indicator when the operating region of the wireless device is in the power-limited region. In some aspects, the network node may receive the status indicator periodically or aperiodically.

In some aspects, the network node may determine the operating region through steps 1510 and 1512. At 1510, the network node may receive from the wireless device a power offset between the received power of the DL signal at the wireless device and an optimal power. The optimal power may be determined by the wireless device based on a maximum DL output gain, and the maximum DL output power of the wireless device. At 1512, the network node may determine the operating region of the wireless device based on the power offset.

In some aspects, the network node may determine the operating regions of the wireless device when amplifying the DL signal through a trial-and-error approach. That is, the network node may transmit, through the wireless device, a plurality of test signals to the user equipment, each of the plurality of test signals associated with one of a plurality of transmission settings different from each other. Then, the network node may receive from the user equipment a measurement of the received signal at the user equipment for each of the plurality of test signals, and determine the operation region of the wireless device based on the plurality of test signals and the corresponding measurements.

After the network node determines the operating region of the wireless device when amplifying the DL signal, the network node may adjust the DL output power of the wireless device to cause the wireless device to operate at the linear region when amplifying the DL signal. The network may adjust the DL output power of the wireless device via various ways.

In some aspects, at 1514, the network node may adjust DL output power of the wireless device by adjusting a transmit power of the DL signal on the network node. In some aspects, at 1516, the network node may adjust at least one of: a maximum DL output gain of the wireless device; or the maximum DL output power of the wireless device. In some aspects, the adjusting the DL output power of the wireless device may include: providing an adjusted maximum DL output gain and an adjusted maximum DL output power to the wireless device, wherein the wireless device is configured to amplify the DL signal under the adjusted maximum DL output gain and the adjusted maximum DL output power. For example, as shown in FIGS. 9A and 9B, the network node may provide new maximum DL output gain ($\hat{G}_{max,DL}$) and new maximum power ($\hat{P}_{TXmax,DL}^{NCR}$), and the wireless device may operate under the new limits when amplifying the DL signal.

In some aspects, wherein the wireless device may be configured to amplify all received DL signals from the network node under the adjusted maximum DL output gain and the adjusted maximum DL output power.

In some aspects, the wireless device may be configured to amplify received DL signals from the network node associated with one or more sets of resources under the adjusted maximum DL output gain and the adjusted maximum DL output power In some aspects, the wireless device may be configured to amplify received DL signals from the network node associated with one or more channel types under the adjusted maximum DL output gain and the adjusted maximum DL output power.

In some aspects, the wireless device may be configured to amplify received DL signals from the network node associated with a receive (Rx) beam under the adjusted maximum DL output gain and the adjusted maximum DL output power.

In some aspects, the wireless device is configured to amplify received DL signals from the network node associated with a frequency band under the adjusted maximum DL output gain and the adjusted maximum DL output power.

In some aspects, at 1518, the network node may provide an adjustment to the DL output power of the wireless device with respect to a reference occasion to the wireless device. In some aspects, the reference occasion may be a latest transmission of the wireless device. In some aspects, the reference occasion may be associated with a slot index, a slot offset, or a beam index. For example, as shown in FIGS. 11A and 11B, the network node may indicate a desired adjustment $\delta_P$ to the output power of the wireless device on a future occasion $i_2$ with respect to a reference occasion $i_1$, and the wireless device may adjust its DL output power accordingly to the desired adjustment $\delta_P$ for the DL output power.

The network node may also provide power control for UL communication. In some aspects, at 1520, the network node may determine the operating region of the wireless device when amplifying an uplink (UL) signal. The operating region may be one of the power-limited region, in which the UL output power of the wireless device reaches a maximum UL output power, and a linear region, in which the UL output power of the wireless device is less than the maximum UL output power. For example, as shown in FIG. 13, when the transmit power of the UE 1206 ($P_{TX}^{UE}$), is less than a power threshold ($P*_{TX,max}^{UE}$), the UL output power of the NCR 1204 ($P_{TX,UL}^{NCR}$), has an approximately linear relationship with the UE's transmit power. In this case, the NCR 1204 works in a linear region 1302. When the UE's transmit power is larger than the power threshold ($P*_{TX,max}^{UE}$), the NCR's UL output power is capped at a maximum value ($P_{TXmax,UL}^{NCR}$). In this case, the NCR 1204 works at a power-limited region 1304.

At 1522, the network node may adjust the UL output power of the wireless device to cause the wireless device to operate at the linear region when amplifying the UL signal.

FIG. 16 is a flowchart 1600 illustrating methods of power control of an NCR in accordance with various aspects of the present disclosure. The methods may be performed by a wireless device, which may be an NCR. The NCR may be the NCR 404, 504, 704, 1204. The method provides DL/UL power control on the NCR, which improves the energy efficiency of the NCR when transmitting DL/UL signals.

As shown in FIG. 16, at 1602, the wireless device may receive, from a network node, a downlink (DL) signal. The wireless device may be an NCR, and may be configured to amplify the DL signal and transmit the amplified DL signal to a UE. The network node may be a base station, or a component of a base station, in the access network of FIG. 1 or a core network component (e.g., base station 102, 310; CU 110; DU 130; RU 140; the base station 702; or the network entity 1802 in the hardware implementation of FIG. 18). The NCR may be the NCR 404, 504, 704, 1204. The UE may be the UE 104, 350, 406, 706, or the apparatus 1804 in the hardware implementation of FIG. 18. FIGS. 5 and 7 illustrate various aspects of a network node transmitting a DL signal to an NCR. As shown in FIG. 7, in one configuration, the network node (e.g., base station 702) may transmit, at 708, a DL signal to the wireless device (e.g., NCR 704). The NCR 704 may be configured to amplify the DL signal and transmit the amplified DL signal to a UE 706.

At 1604, the wireless device may transmit, to the network node, a DL status. The DL status may indicate an operating region of the wireless device when amplifying the DL signal. The operating region is one of a power-limited region, in which the DL output power of the wireless device reaches a maximum DL output power, and a linear region, in which the DL output power of the wireless device is less than the maximum DL output power. For example, as shown in FIG. 6, in the linear region 602, the transmit power of the base station 502 ($P_{TX}^{gNB}$), is less than a power threshold (i.e., ($P^*_{TX,max}{}^{gNB}$), and the DL output power of the NCR 504 ($P_{TX,DL}{}^{NCR}$) has an approximately linear relationship with the base station 502's transmit power. In the power-limited region 604, the base station 502's transmit power is larger than the power threshold ($P^*_{TX,max}{}^{gNB}$), and the NCR 504's DL output power is capped at a maximum value ($P^*_{TXmax,DL}{}^{NCR}$).

In some aspects, the DL status may include a maximum DL output gain of the wireless device, the maximum DL output power of the wireless device, and the received power of the DL signal at the wireless device.

In some aspects, the DL status may include a status indicator indicating the operating region of the wireless device is one of the linear region and the power-limited region.

In some aspects, the DL status may be transmitted to the network node when the operating region of the wireless device is the power-limited region.

In some aspects, the DL status may be transmitted to the network node periodically or aperiodic ally.

In some aspects, the DL status may include a power offset between the received power of the DL signal at the wireless device and an optimal power. The optimal power may be determined by the wireless device based on the maximum DL output gain, and the maximum DL output power of the wireless device.

FIG. 17 is a flowchart 1700 illustrating methods of power control of an NCR in accordance with various aspects of the present disclosure. The methods may be performed by a wireless device, which may be an NCR. The method provides DL/UL power control on the NCR, which improves the energy efficiency of the NCR when transmitting DL/UL signals.

As shown in FIG. 17, at 1702, the wireless device may receive a DL signal from the network node. The wireless device may be an NCR, and may be configured to amplify the DL signal and transmit the amplified DL signal to a UE. The network node may be a base station, or a component of a base station, in the access network of FIG. 1 or a core network component (e.g., base station 102, 310; CU 110; DU 130; RU 140; base station 402, 502, 702, 1202; or the network entity 1802 in the hardware implementation of FIG. 18). The NCR may be the NCR 404, 504, 704, 1204. The UE may be the UE 104, 350, 406, 706, or the apparatus 1804 in the hardware implementation of FIG. 18.

At 1704, the wireless device may transmit, to the network node, a DL status. The DL status may indicate an operating region of the wireless device when amplifying the DL signal. The operating region is one of a power-limited region, in which the DL output power of the wireless device reaches a maximum DL output power, and a linear region, in which the DL output power of the wireless device is less than the maximum DL output power. As shown in FIG. 6, in the linear region 602, the transmit power of the base station 502 ($P^*_{TX}{}^{gNB}$) is less than a power threshold (i.e., $P^*_{TX,max}{}^{gNB}$) and the DL output power of the NCR 504 ($P^*_{TX,DL}{}^{NCR}$) has an approximately linear relationship with the base station 502's transmit power. In the power-limited region 604, the base station 502's transmit power is larger than the power threshold ($P^*_{TX,max}{}^{gNB}$), and the NCR 504's DL output power is capped at a maximum value $P^*_{TXmax,DL}{}^{NCR}$.

At 1706, the wireless device may receive power control parameters for amplifying the DL signal. The power control parameters may include at least one of: an adjusted maximum DL output gain of the wireless device; or an adjusted maximum DL output power of the wireless device. The wireless device may be configured to amplify the DL signal under at least one of the adjusted maximum DL output gain and the adjusted maximum DL output power.

In addition to performing DL power control on the wireless device, as described at 1702, 1704, and 1706, the method may also include UL power control on the wireless device.

In some aspects, at 1708, the wireless device may receive, from the UE, a UL signal, wherein the wireless device is configured to amplify the UL signal and transmit the amplified UL signal to the network node. FIG. 12 illustrates various aspects of a UE 1206 transmits a UL signal to an NCR 1204. As shown in FIG. 12, in one configuration, the UE (1206) may transmit a DL signal to the NCR (1204). The NCR 1204 may be configured to amplify the DL signal and transmit the amplified DL signal to a base station 1202.

At 1710, the wireless device may transmit, to the network node, a UL status. The UL status may indicate an operating region of the wireless device when amplifying the UL signal. The operating region is one of the power-limited region, in which the UL output power of the wireless device reaches a maximum UL output power, and the linear region, in which the UL output power of the wireless device is less than the maximum UL output power.

In some aspects, the UL status may include a maximum UL output gain of the wireless device, the maximum UL output power of the wireless device, and the received power of the UL signal at the wireless device.

Figure 18:
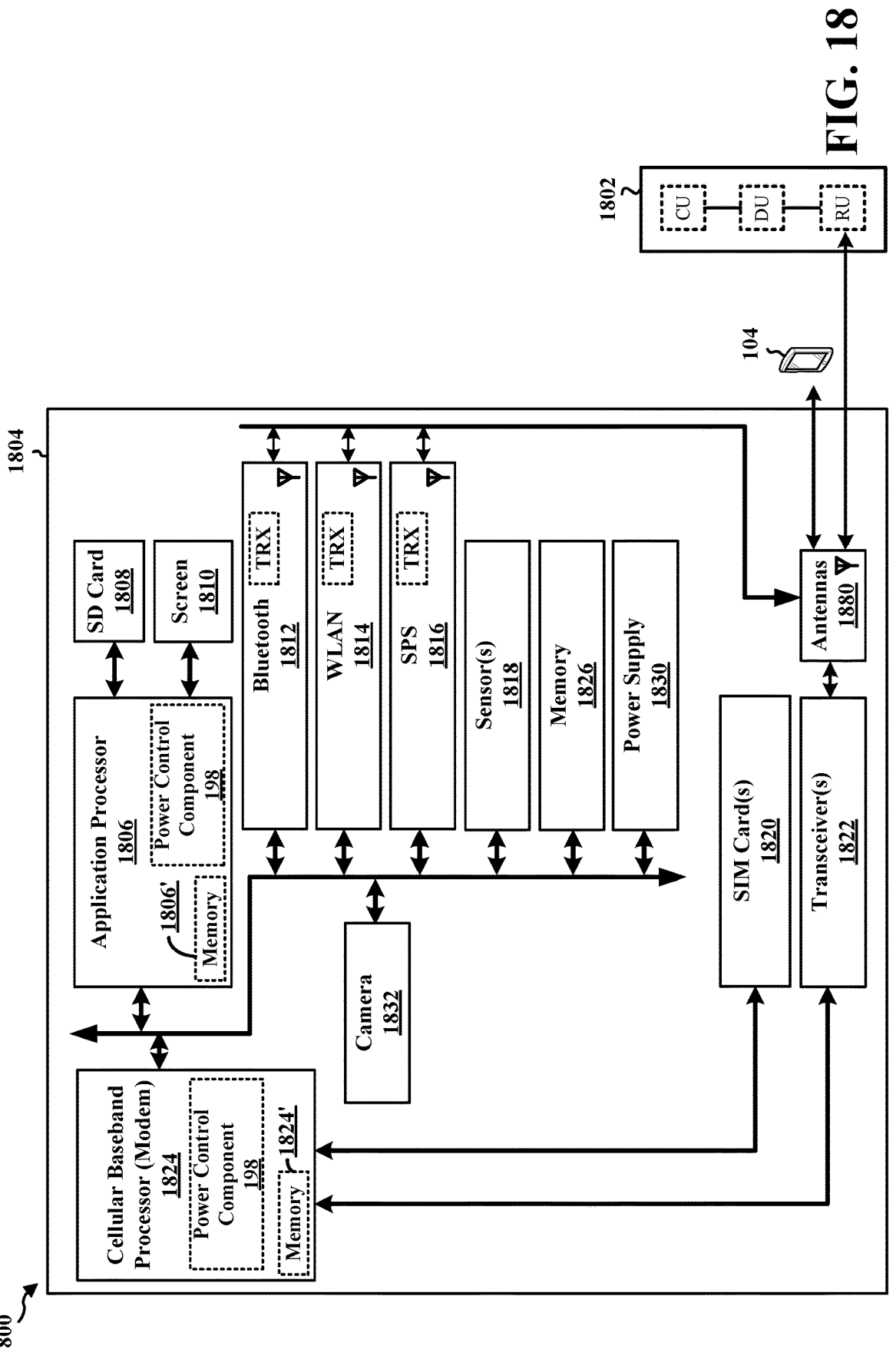
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include at least one cellular baseband processor 1824 (also referred to as a modem) coupled to one or more transceivers 1822 (e.g., cellular RF transceiver). The cellular baseband processor(s) 1824 may include at least one on-chip memory 1824'. In some aspects, the apparatus 1804 may further include one or more subscriber identity modules (SIM) cards 1820 and at least one application processor 1806 coupled to a secure digital (SD) card 1808 and a screen 1810. The application processor(s) 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor(s) 1824 communicates through the transceiver(s) 1822 via one or more antennas 1880 with the UE 104 and/or with an RU associated with a network entity 1802. The cellular baseband processor(s) 1824 and the application processor(s) 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor(s) 1824 and the application processor(s) 1806 are each responsible for general processing, including the execution of software stored on the computer-readable medium/memory. The software, when executed by the cellular baseband processor(s) 1824/application processor(s) 1806, causes the cellular baseband processor(s) 1824/application processor(s) 1806 to perform the various functions described supra. The cellular baseband processor(s) 1824 and the application processor(s) 1806 are configured to perform the various functions described supra based at least in part of the information stored in the memory. That is, the cellular baseband processor(s) 1824 and the application processor(s) 1806 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1824/application processor(s) 1806 when executing software. The cellular baseband processor(s) 1824/application processor(s) 1806 may be a component of the UE 350 and may include the at least one memory 360 and/or at least one of the TX processor 368, the RX processor 356, and the controller/processor 359. In one configuration, the apparatus 1804 may be a processor chip (modem and/or application) and include just the cellular baseband processor(s) 1824 and/or the application processor(s) 1806, and in another configuration, the apparatus 1804 may be the entire UE (e.g., see UE 350 of FIG. 3) and include the additional modules of the apparatus 1804. The apparatus 1804 may include a power control component 198 that is configured to cause the UE to perform any of the aspects described in connection with the UE in FIG. 7.

Figure 19:
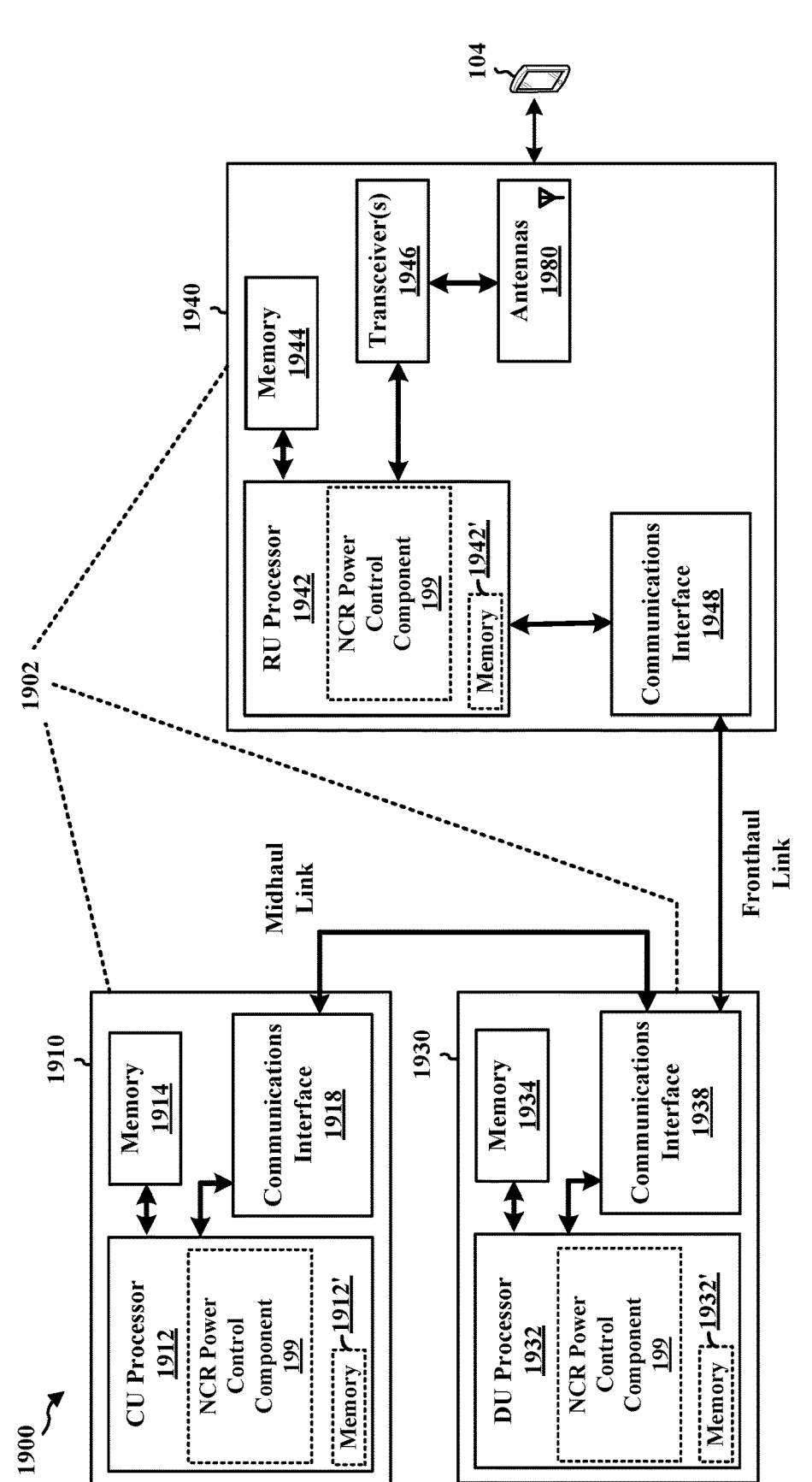
FIG. 19 is a diagram illustrating an example of a hardware implementation for an example network entity.

FIG. 19 is a diagram 1900 illustrating an example of a hardware implementation for a network entity 1902, which may also be referred to as a network node. The network entity 1902 may be a base station, a component of a base station, or may implement base station functionality. The network entity 1902 may include at least one of a CU 1910, a DU 1930, or an RU 1940. For example, depending on the layer functionality handled by the NCR power control component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include at least one CU processor 1912. The CU processor(s) 1912 may include on-chip memory 1912'. In some aspects, the CU 1910 may further include additional memory modules 1914 and a communications interface 1918. The CU 1910 communicates with the DU 1930 through a midhaul link, such as an F1 interface. The DU 1930 may include at least one DU processor 1932. The DU processor(s) 1932 may include on-chip memory 1932'. In some aspects, the DU 1930 may further include additional memory modules 1934 and a communications interface 1938. The DU 1930 communicates with the RU 1940 through a fronthaul link. The RU 1940 may include at least one RU processor 1942. The RU processor(s) 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memory 1912', 1932', 1942' and the additional memory modules 1914, 1934, 1944 may each be considered a computer-readable medium/memory. Each computer-readable medium/memory may be non-transitory. Each of the processors 1912, 1932, 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the NCR power control component 199 may be configured to transmit, to a wireless device, a downlink (DL) signal, wherein the wireless device is configured to amplify the DL signal and transmit the amplified DL signal to a user equipment; determine, an operating region of the wireless device when amplifying the DL signal, wherein the operating region is one of a power-limited region, in which the DL output power of the wireless device reaches a maximum DL output power, and a linear region, in which the DL output power of the wireless device is less than the maximum DL output power; and adjust the DL output power of the wireless device to cause the wireless device to operate at the linear region when amplifying the DL signal. The NCR power control component 199 may be further configured to perform any of the aspects described in connection with the flowcharts in FIG. 14 and FIG. 15, and/or the aspects performed by the base station in FIG. 7. The NCR power control component 199 may be within one or more processors of one or more of the CU 1910, DU 1930, and the RU 1940. The NCR power control component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1902 may include a variety of components configured for various functions. In one configuration, the network entity 1902 includes means for transmitting, to a wireless device, a downlink (DL) signal, wherein the wireless device is configured to amplify the DL signal and transmit the amplified DL signal to a user equipment; means for determining an operating region of the wireless device when amplifying the DL signal, wherein the operating region is one of a power-limited region, in which the DL output power of the wireless device reaches a maximum DL output power, and a linear region, in which the DL output power of the wireless device is less than the maximum DL output power; and means for adjusting the DL output power of the wireless device to cause the wireless device to operate at the linear region when amplifying the DL signal. The network entity 1902 may further include means for performing any of the aspects described in connection with the flowcharts in FIG. 14 and FIG. 15, and/or the aspects performed by the base station in FIG. 7. The means may be the NCR power control component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

Figure 20:
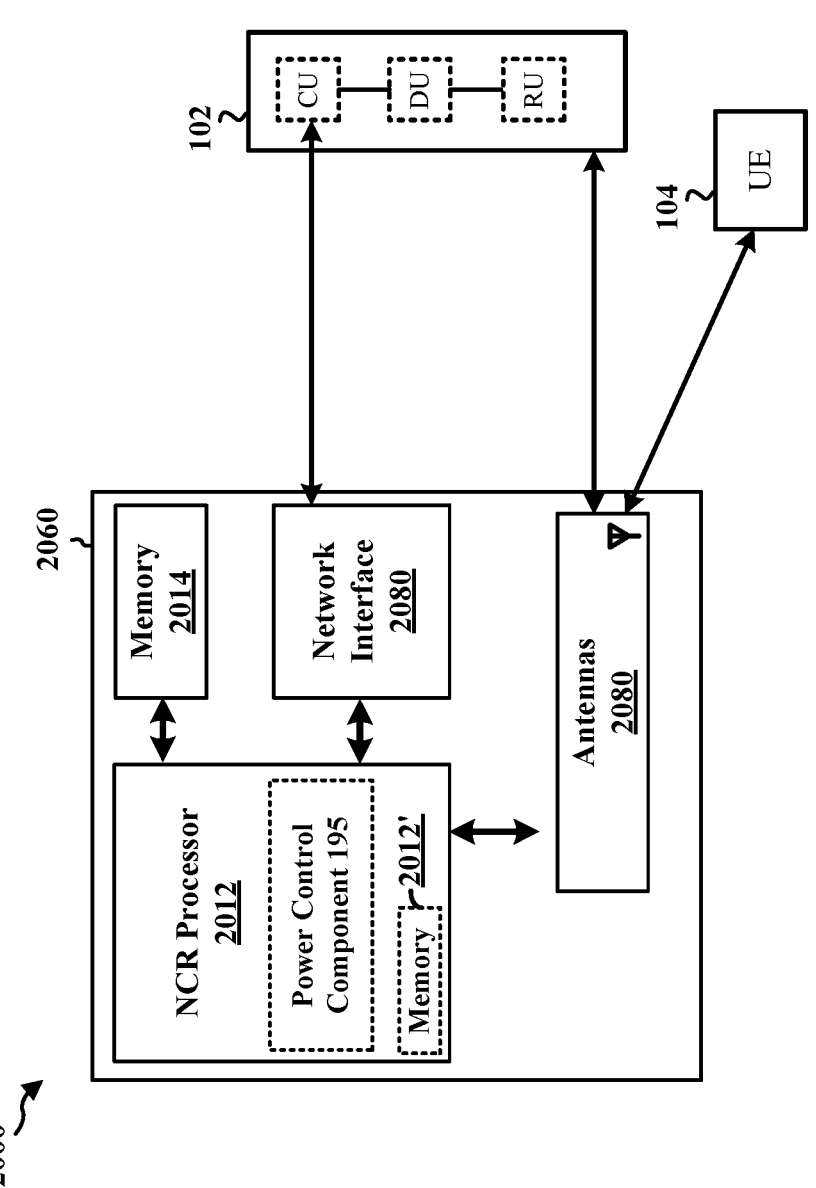
FIG. 20 is a diagram illustrating an example of a hardware implementation for an example network entity.

FIG. 20 is a diagram 2000 illustrating an example of a hardware implementation for a network entity 2060. In one example, the network entity 2060 may be an NCR 197. The network entity 2060 may include at least one NCR processor 2012. The NCR processor(s) 2012 may include on-chip memory 2012'. In some aspects, the network entity 2060 may further include additional memory modules 2014. The network entity 2060 communicates via the network interface 2080 directly (e.g., backhaul link) or indirectly (e.g., through a RIC) with the CU. The on-chip memory 2012' and the additional memory modules 2014 may each be considered a computer-readable medium/memory. Each computer-readable medium/memory may be non-transitory. The processor(s) 2012 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the apparatus may include a power control component 195 that is configured to receive, from a network node, a DL signal, wherein the wireless device is configured to amplify the DL signal and transmit the amplified DL signal to a user equipment; and transmit, from the wireless device, to the network node, a DL status, the DL status indicating an operating region of the wireless device when amplifying the DL signal, wherein the operating region is one of a power-limited region, in which the DL output power of the wireless device reaches a maximum DL output power, and a linear region, in which the DL output power of the wireless device is less than the maximum DL output power. The power control component 195 may be further configured to perform any of the aspects described in connection with the flowcharts in FIG. 16 and FIG. 17, and/or the aspects performed by the NCR in FIG. 7. The power control component 195 may be within the processor(s) 2012. The power control component 195 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2060 may include a variety of components configured for various functions. In one configuration, the network entity 2060 may include means for receiving, from a network node, a downlink (DL) signal, wherein the wireless device is configured to amplify the DL signal and transmit the amplified DL signal to a user equipment; and means for transmitting, from the wireless device, to the network node, a DL status, the DL status indicating an operating region of the wireless device when amplifying the DL signal, wherein the operating region is one of a power-limited region, in which the DL output power of the wireless device reaches a maximum DL output power, and a linear region, in which the DL output power of the wireless device is less than the maximum DL output power. The network entity 2060 may further include means for performing any of the aspects described in connection with the flowcharts in FIG. 16 and FIG. 17, and/or the aspects performed by the NCR in FIG. 7. The means may be the power control component 195 of the network entity 2060 configured to perform the functions recited by the means.

This disclosure provides a method of power control of NCR for DL/UL transmission. The method may include transmitting, by the network node, to an NCR, a DL signal, wherein the NCR is configured to amplify the DL signal and transmit the amplified DL signal to a UE; determining, by the network node, an operating region of the NCR when amplifying the DL signal, wherein the operating region is one of a power-limited region, in which the DL output power of the NCR reaches a maximum DL output power, and a linear region, in which the DL output power of the NCR is less than the maximum DL output power; and adjusting, by the network node, the DL output power of the NCR to cause the NCR to operate at the linear region when amplifying the DL signal. This power control method may improve the energy efficiency of the NCR when transmitting DL/UL signals.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network node. The method comprises transmitting, by the network node, to a wireless device, a downlink (DL) signal for amplification and transmission of an amplified DL signal to a user equipment; determining, by the network node, an operating region of the wireless device when amplifying the DL signal, wherein the operating region is one of a power-limited region, in which the DL output power of the wireless device reaches a maximum DL output power, and a linear region, in which the DL output power of the wireless device is less than the maximum DL output power; and adjusting, by the network node, the DL output power of the wireless device to cause the wireless device to operate at the linear region when amplifying the DL signal.

Aspect 2 is the method of aspect 1, wherein determining the operating region of the ireless device when amplifying the DL signal comprises: receiving, from the wireless device, a maximum DL output gain of the wireless device, the maximum DL output power of the wireless device, and the received power of the DL signal at the wireless device; and determining, based on the maximum DL output gain, the maximum DL output power, and the received power, the operating region of the wireless device.

Aspect 3 is the method of aspect 1 or aspect 2, wherein determining the operating region of the wireless device when amplifying the DL signal comprises: receiving, from the wireless device, a status indicator, the status indicator indicating the operating region of the wireless device is one of the linear region and the power-limited region.

Aspect 4 is the method of aspect 3, wherein receiving the status indicator comprises: receiving, in response to the operating region of the wireless device being the power-limited region, the status indicator.

Aspect 5 is the method of aspect 3, wherein receiving the status indicator comprises: receiving the status indicator periodically or aperiodically.

Aspect 6 is the method of aspect 1, wherein determining the operating region of the wireless device when amplifying the DL signal comprises: receiving, from the wireless device, a power offset between the received power of the DL signal at the wireless device and an optimal power, wherein the optimal power is determined by the wireless device based on a maximum DL output gain, and the maximum DL output power of the wireless device; and determining, based on the power offset, the operating region of the wireless device.

Aspect 7 is the method of aspect 1, wherein determining the operating region of the wireless device when amplifying the DL signal comprises: transmitting, through the wireless device, a plurality of test signals to the user equipment, each of the plurality of test signals associated with one of a plurality of transmission settings different from each other; receiving, for each of the plurality of test signals, from the user equipment, a measurement of the received signal at the user equipment; and determining, based on the plurality of test signals and the corresponding measurements, the operation region of the wireless device.

Aspect 8 is the method of any of aspects 1-7, wherein adjusting the DL output power of the wireless device comprises: adjusting the DL output power of the wireless device by adjusting a transmit power of the DL signal on the network node.

Aspect 9 is the method of any of aspects 1-7, wherein adjusting the DL output power of the wireless device comprises: adjusting at least one of: a maximum DL output gain of the wireless device; or the maximum DL output power of the wireless device.

Aspect 10 is the method of aspect 9, wherein adjusting the DL output power of the wireless device comprises: providing an adjusted maximum DL output gain and an adjusted maximum DL output power to the wireless device, wherein the wireless device is configured to amplify the DL signal under the adjusted maximum DL output gain and the adjusted maximum DL output power.

Aspect 11 is the method of aspect 9, wherein the wireless device is configured to amplify all received DL signals from the network node under the adjusted maximum DL output gain and the adjusted maximum DL output power.

Aspect 12 is the method of aspect 9, wherein the wireless device is configured to amplify received DL signals from the network node associated with one or more sets of resources under the adjusted maximum DL output gain and the adjusted maximum DL output power.

Aspect 13 is the method of aspect 9, wherein the wireless device is configured to amplify received DL signals from the network node associated with one or more channel types under the adjusted maximum DL output gain and the adjusted maximum DL output power.

Aspect 14 is the method of aspect 9, wherein the wireless device is configured to amplify received DL signals from the network node associated with a receive (Rx) beam under the adjusted maximum DL output gain and the adjusted maximum DL output power.

Aspect 15 is the method of aspect 9, wherein the wireless device is configured to amplify received DL signals from the network node associated with a frequency band under the adjusted maximum DL output gain and the adjusted maximum DL output power.

Aspect 16 is the method of any of aspects 1-7 or 9-15, wherein adjusting the DL output power of the wireless device comprises: providing, by the network node, to the wireless device, an adjustment to the DL output power of the wireless device with respect to a reference occasion.

Aspect 17 is the method of aspect 16, wherein the reference occasion is a latest transmission of the wireless device.

Aspect 18 is the method of aspect 16, wherein the reference occasion is associated with a slot index, a slot offset, or a beam index.

Aspect 19 is the method of any of aspects 1-18, wherein the method further comprises: determining, by the network node, the operating region of the wireless device when amplifying an uplink (UL) signal, wherein the operating region is one of the power-limited region, in which the UL output power of the wireless device reaches a maximum UL output power, and a linear region, in which the UL output power of the wireless device is less than the maximum UL output power; and adjusting, by the network node, the UL output power of the wireless device to cause the wireless device to operate at the linear region when amplifying the UL signal.

Aspect 20 is a method for wireless communication at a wireless device. The method may include: receiving, from a network node, a downlink (DL) signal, wherein the wireless device is configured to amplify the DL signal and transmit the amplified DL signal to a user equipment; and transmitting, from the wireless device, to the network node, a DL status, the DL status indicating an operating region of the wireless device when amplifying the DL signal, wherein the operating region is one of a power-limited region, in which the DL output power of the wireless device reaches a maximum DL output power, and a linear region, in which the DL output power of the wireless device is less than the maximum DL output power.

Aspect 21 is the method of aspect 20, wherein the DL status includes: a maximum DL output gain of the wireless device, the maximum DL output power of the wireless device, and the received power of the DL signal at the wireless device.

Aspect 22 is the method of aspect 20 or 21, wherein the DL status includes: a status indicator indicating the operating region of the wireless device is one of the linear region and the power-limited region.

Aspect 23 is the method of aspect 22, wherein transmitting the DL status comprises: transmitting, in response to the operating region of the wireless device being the power-limited region, the DL status.

Aspect 24 is the method of any of aspects 20-23, wherein transmitting the DL status comprises: transmitting the DL status periodically or aperiodically.

Aspect 25 is the method of aspect 20, wherein the DL status includes: a power offset between the received power of the DL signal at the wireless device and an optimal power, wherein the optimal power is determined by the wireless device based on the maximum DL output gain, and the maximum DL output power of the wireless device.

Aspect 26 is the method of any of aspects 20-25, wherein the method further includes: receiving, from the network node, power control parameters for amplifying the DL signal, wherein the power control parameters comprise at least one of: an adjusted maximum DL output gain of the wireless device; or an adjusted maximum DL output power of the wireless device, wherein the wireless device is configured to amplify the DL signal under at least one of the adjusted maximum DL output gain and the adjusted maximum DL output power.

Aspect 27 is the method of any of aspects 20-26, wherein the method further includes: receiving, from the user equipment, a UL signal, wherein the wireless device is configured to amplify the UL signal and transmit the amplified UL signal to the network node; and transmitting, from the wireless device, to the network node, a UL status, the UL status indicating an operating region of the wireless device when amplifying the UL signal, wherein the operating region is one of the power-limited region, in which the UL output power of the wireless device reaches a maximum UL output power, and the linear region, in which the UL output power of the wireless device is less than the maximum UL output power.

Aspect 28 is the method of aspect 27, wherein the UL status comprises: a maximum UL output gain of the wireless device, the maximum UL output power of the wireless device, and the received power of the UL signal at the wireless device.

Aspect 29 is an apparatus for wireless communication at a network node, comprising: at least one memory; and at least one processor coupled to the at least one memory and, based at least in part on information stored in the at least one memory, the at least one processor, individually or in any combination, is configured to cause the network node to perform the method of any of aspects 1-19.

Aspect 30 is an apparatus for wireless communication at a network node, comprising: one or more memories; and one or more processors coupled to the one or more memories and, based at least in part on information stored in the one or more memories, the one or more processors, individually or in any combination, are configured to cause the network node to perform the method of any of aspects 1-19.

In aspect 31, the apparatus of claim 29 or 30, further includes at least one transceiver coupled to the one or more processors.

Aspect 32 is an apparatus for wireless communication at a network node, comprising: means for performing the method of any of aspects 1-19.

Aspect 33 is a computer-readable medium (e.g., a non-transitory computer-readable medium) storing computer executable code at a network node, the code when executed by at least one processor causes the network node to perform the method of any of aspects 1-19.

Aspect 34 is an apparatus for wireless communication at a wireless device, comprising: at least one memory; and at least one processor coupled to the at least one memory and, based at least in part on information stored in the at least one memory, the at least one processor, individually or in any combination, is configured to cause the wireless device to perform the method of any of aspects 20-28.

Aspect 35 is an apparatus for wireless communication at a wireless device, comprising: one or more memories; and one or more processors coupled to the one or more memories and, based at least in part on information stored in the one or more memories, the one or more processors, individually or in any combination, are configured to cause the wireless device to perform the method of any of aspects 20-28.

In aspect 36, the apparatus of aspect 34 or 35, further includes at least one transceiver coupled to the one or more processors.

Aspect 37 is an apparatus for wireless communication at a wireless device, comprising: means for performing the method of any of aspects 20-28.

Aspect 38 is a computer-readable medium (e.g., a non-transitory computer-readable medium) storing computer executable code at a wireless device, the code when executed by at least one processor causes the wireless device to perform the method of any of aspects 20-28.

The invention claimed is:

1. An apparatus for wireless communication at a network node, comprising:

at least one memory; and at least one processor coupled to the at least one memory and, based at least in part on information stored in the at least one memory, the at least one processor, individually or in any combination, is configured to cause the network node to:

transmit, by the network node, to a wireless device, a downlink (DL) signal for amplification and transmission of an amplified DL signal to a user equipment;

determine an operating region of the wireless device for amplifying the DL signal, wherein the operating region is one of a power-limited region in which a DL output power of the wireless device reaches a maximum DL output power, and a linear region, in which the DL output power of the wireless device is less than the maximum DL output power; and adjust, by the network node, the DL output power of the wireless device to cause the wireless device to operate at the linear region when amplifying the DL signal.

2. The apparatus of claim 1, further comprising a transceiver coupled to the at least one processor, wherein, to transmit the DL signal, the at least one processor, individually or in any combination, is configured to transmit the DL signal via the transceiver, and wherein to determine the operating region of the wireless device when amplifying the DL signal, the at least one processor, individually or in any combination, is configured to cause the network node to:

receive, from the wireless device, a maximum DL output gain of the wireless device, the maximum DL output power of the wireless device, and a received power of the DL signal at the wireless device; and determine, based on the maximum DL output gain, the maximum DL output power, and the received power, the operating region of the wireless device.

3. The apparatus of claim 1, wherein to determine the operating region of the wireless device when amplifying the DL signal, the at least one processor, individually or in any combination, is configured to cause the network node to:

receive, from the wireless device, a status indicator, the status indicator indicating the operating region of the wireless device is one of the linear region and the power-limited region.

4. The apparatus of claim 3, wherein to receive the status indicator, the at least one processor, individually or in any combination, is configured to cause the network node to:

receive, in response to the operating region of the wireless device being the power-limited region, the status indicator.

5. The apparatus of claim 3, wherein to receive the status indicator, the at least one processor, individually or in any combination, is configured to cause the network node to:

receive the status indicator periodically or aperiodically.

6. The apparatus of claim 1, wherein to determine the operating region of the wireless device when amplifying the DL signal, the at least one processor, individually or in any combination, is configured to cause the network node to:

receive, from the wireless device, a power offset between a received power of the DL signal at the wireless device and an optimal power, wherein the optimal power is determined by the wireless device based on a maximum DL output gain, and the maximum DL output power of the wireless device; and determine, based on the power offset, the operating region of the wireless device.

7. The apparatus of claim 1, wherein to determine the operating region of the wireless device when amplifying the DL signal, the at least one processor, individually or in any combination, is configured to cause the network node to:

transmit, through the wireless device, a plurality of test signals to the user equipment, each of the plurality of test signals associated with one of a plurality of transmission settings different from each other;

receive, for each of the plurality of test signals, from the user equipment, a measurement of a received signal at the user equipment; and determine, based on the plurality of test signals and corresponding measurements, the operating region of the wireless device.

8. The apparatus of claim 1, wherein to adjust the DL output power of the wireless device, the at least one processor, individually or in any combination, is configured to cause the network node to:

adjust a transmit power of the DL signal on the network node.

9. The apparatus of claim 1, wherein to adjust the DL output power of the wireless device, the at least one processor, individually or in any combination, is configured to cause the network node to:

indicate at least one of:

an adjusted maximum DL output gain of the wireless device; or an adjusted maximum DL output power of the wireless device.

10. The apparatus of claim 9, wherein to adjust the DL output power of the wireless device, the at least one processor, individually or in any combination, is configured to cause the network node to indicate for the wireless device to amplify the DL signal under the adjusted maximum DL output gain and the adjusted maximum DL output power.

11. The apparatus of claim 9, wherein the at least one processor, individually or in any combination, is further configured to cause the network node to indicate for the wireless device to amplify all received DL signals from the network node under the adjusted maximum DL output gain and the adjusted maximum DL output power.

12. The apparatus of claim 9, wherein the at least one processor, individually or in any combination, is further configured to cause the network node to indicate for the wireless device to amplify received DL signals from the network node associated with one or more sets of resources under the adjusted maximum DL output gain and the adjusted maximum DL output power.

13. The apparatus of claim 9, wherein the at least one processor, individually or in any combination, is further configured to cause the network node to indicate for the wireless device to amplify received DL signals from the network node associated with one or more channel types under the adjusted maximum DL output gain and the adjusted maximum DL output power.

14. The apparatus of claim 9, wherein the at least one processor, individually or in any combination, is further configured to cause the network node to indicate for the wireless device to amplify received DL signals from the network node associated with a receive (Rx) beam under the adjusted maximum DL output gain and the adjusted maximum DL output power.

15. The apparatus of claim 9, wherein the at least one processor, individually or in any combination, is further configured to cause the network node to indicate for the wireless device to amplify received DL signals from the network node associated with a frequency band under the adjusted maximum DL output gain and the adjusted maximum DL output power.

16. The apparatus of claim 1, wherein to adjust the DL output power of the wireless device, the at least one processor, individually or in any combination, is configured to cause the network node to:

provide, to the wireless device, an adjustment to the DL output power of the wireless device with respect to a reference occasion.

17. The apparatus of claim 16, wherein the reference occasion is a latest transmission of the wireless device.

18. The apparatus of claim 16, wherein the reference occasion is associated with a slot index, a slot offset, or a beam index.

19. The apparatus of claim 1, wherein the at least one processor, individually or in any combination, is further configured to cause the network node to:

determine the operating region of the wireless device when amplifying an uplink (UL) signal, wherein the operating region is one of the power-limited region, in which a UL output power of the wireless device reaches a maximum UL output power, and the linear region, in which the UL output power of the wireless device is less than the maximum UL output power; and indicate an adjustment to the UL output power of the wireless device to cause the wireless device to operate at the linear region when amplifying the UL signal.

20. An apparatus for wireless communication at a wireless device, comprising:

at least one memory; and at least one processor coupled to the at least one memory and, based at least in part on information stored in the at least one memory, the at least one processor, individually or in any combination, is configured to cause the wireless device to:

receive, from a network node, a downlink (DL) signal, wherein the wireless device is configured to amplify the DL signal and transmit an amplified DL signal to a user equipment; and transmit, from the wireless device, to the network node, a DL status, the DL status indicating an operating region of the wireless device when amplifying the DL signal, wherein the operating region is one of a power-limited region, in which a DL output power of the wireless device reaches a maximum DL output power, and a linear region, in which the DL output power of the wireless device is less than the maximum DL output power.

21. The apparatus of claim 20, further comprising a transceiver coupled to the at least one processor, wherein, to receive the DL signal, the at least one processor, individually or in any combination, is configured to receive the DL signal via the transceiver, and wherein the DL status includes:

a maximum DL output gain of the wireless device, the maximum DL output power of the wireless device, and a received power of the DL signal at the wireless device.

22. The apparatus of claim 20, wherein the DL status includes:

a status indicator indicating the operating region of the wireless device is one of the linear region and the power-limited region.

23. The apparatus of claim 22, wherein to transmit the DL status, the at least one processor, individually or in any combination, is configured to cause the wireless device to transmit, in response to the operating region of the wireless device being the power-limited region, the DL status.

24. The apparatus of claim 22, wherein to transmit the DL status, the at least one processor, individually or in any combination, is configured to cause the wireless device to transmit the DL status periodically or aperiodically.

25. The apparatus of claim 20, wherein the DL status includes:

a power offset between a received power of the DL signal at the wireless device and an optimal power, wherein the optimal power is based on a maximum DL output gain, and the maximum DL output power of the wireless device.

26. The apparatus of claim 20, wherein the at least one processor, individually or in any combination, is further configured to cause the wireless device to:

receive, from the network node, power control parameters for amplifying the DL signal, wherein the power control parameters comprise at least one of:

an adjusted maximum DL output gain of the wireless device; or an adjusted maximum DL output power of the wireless device; and amplify the DL signal under at least one of the adjusted maximum DL output gain and the adjusted maximum DL output power.

27. The apparatus of claim 20, wherein the at least one processor, individually or in any combination, is further configured to cause the wireless device to:

receive, from the user equipment, a UL signal, wherein the wireless device is configured to amplify the UL signal and transmit an amplified UL signal to the network node; and transmit, from the wireless device, to the network node, a UL status, the UL status indicating an uplink operating region of the wireless device when amplifying the UL signal, wherein the uplink operating region is one of the power-limited region, in which a UL output power of the wireless device reaches a maximum UL output power, and the linear region, in which the UL output power of the wireless device is less than the maximum UL output power.

28. The apparatus of claim 27, wherein the UL status comprises:

a maximum UL output gain of the wireless device, the maximum UL output power of the wireless device, and a received power of the UL signal at the wireless device.

29. A method for wireless communication at a network node, comprising:

transmitting, by the network node, to a wireless device, a downlink (DL) signal for amplification and transmission of an amplified DL signal to a user equipment;

determining, by the network node, an operating region of the wireless device when amplifying the DL signal, wherein the operating region is one of a power-limited region, in which a DL output power of the wireless device reaches a maximum DL output power, and a linear region, in which the DL output power of the wireless device is less than the maximum DL output power; and adjusting, by the network node, the DL output power of the wireless device to cause the wireless device to operate at the linear region when amplifying the DL signal.

30. A method for wireless communication at a wireless device, comprising:

receiving, from a network node, a downlink (DL) signal, wherein the wireless device is configured to amplify the DL signal and transmit an amplified DL signal to a user equipment; and transmitting, from the wireless device, to the network node, a DL status, the DL status indicating an operating region of the wireless device when amplifying the DL signal, wherein the operating region is one of a power-limited region, in which a DL output power of the wireless device reaches a maximum DL output power, and a linear region, in which the DL output power of the wireless device is less than the maximum DL output power.

* * * * *